(12) United States Patent
Stevens et al.

(10) Patent No.: US 12,166,638 B1
(45) Date of Patent: Dec. 10, 2024

(54) INTERNET OF THINGS (IoT) SYSTEMS AND METHODS

(71) Applicant: CABLE TELEVISION LABORATORIES, INC., Louisville, CO (US)

(72) Inventors: Clarke Stevens, Parker, CO (US); Brian A. Scriber, Lafayette, CO (US); Andrew Alexander Dolan, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/244,865

(22) Filed: Apr. 29, 2021

Related U.S. Application Data

(60) Provisional application No. 63/180,510, filed on Apr. 27, 2021, provisional application No. 63/017,393, filed on Apr. 29, 2020.

(51) Int. Cl.
| | | |
|---|---|---|
| *H04L 41/12* | (2022.01) | |
| *G16Y 40/40* | (2020.01) | |
| *H04L 9/40* | (2022.01) | |
| *H04L 41/08* | (2022.01) | |
| *H04L 67/12* | (2022.01) | |

(52) U.S. Cl.
CPC .............. *H04L 41/12* (2013.01); *G16Y 40/40* (2020.01); *H04L 41/08* (2013.01); *H04L 67/12* (2013.01); *H04L 63/101* (2013.01)

(58) Field of Classification Search
CPC ....... H04L 41/145; H04L 41/12; H04L 41/08; H04L 41/0806; H04L 41/084; H04L 41/0809; H04L 67/12; H04L 41/0803; H04L 63/101; H04L 69/08; H04L 69/18; H04L 12/2807; H04L 63/08; H04L 9/0866; H04L 63/0876; G16Y 40/40; H04W 12/06; H04W 12/08; H04W 8/005; H04W 48/16
See application file for complete search history.

(56) References Cited

U.S. PATENT DOCUMENTS

| | | | | |
|---|---|---|---|---|
| 8,051,489 B1 * | 11/2011 | Montenegro | ......... | H04L 63/065 726/29 |
| 8,422,401 B1 * | 4/2013 | Choong | .............. | H04L 12/2827 370/254 |
| 10,574,654 B1 * | 2/2020 | Schroeder | ........... | H04L 63/0209 |

(Continued)

OTHER PUBLICATIONS

Open Connectivity Foundation (OCF), OCF Streamlined Onboarding Specification 0.0.1., Jan. 2021, pp. 1-18. (Year: 2021).

(Continued)

*Primary Examiner* — Tonia L Dollinger
*Assistant Examiner* — Linh T. Nguyen
(74) *Attorney, Agent, or Firm* — Cozen O'Connor

(57) ABSTRACT

In some implementations, an onboarding device may enable an onboarding application running on a platform. The onboarding device may receive configuration data for a desired device to determine compatibility with a network. The onboarding device may determine, based on a comparison between configuration data and a configuration criteria for the network, whether a compatibility threshold has been satisfied. The onboarding device may determine, when the compatibility threshold has been satisfied, whether the desired device is compatible with the particular network.

14 Claims, 11 Drawing Sheets

(56) References Cited

U.S. PATENT DOCUMENTS

| | | | |
|---|---|---|---|
| 2004/0158780 A1* | 8/2004 | Conrad | H04L 41/22 |
| | | | 714/100 |
| 2011/0302201 A1* | 12/2011 | Ogaz | G06Q 30/0641 |
| | | | 707/769 |
| 2014/0094124 A1* | 4/2014 | Dave | H04W 8/20 |
| | | | 455/41.2 |
| 2014/0181279 A1* | 6/2014 | Louis | H04L 12/2807 |
| | | | 709/222 |
| 2014/0351882 A1* | 11/2014 | Marvais | G06F 9/4401 |
| | | | 713/1 |
| 2015/0032867 A1* | 1/2015 | Lihosit | H04L 41/082 |
| | | | 709/221 |
| 2015/0121470 A1* | 4/2015 | Rongo | H04L 63/083 |
| | | | 726/4 |
| 2015/0130957 A1 | 5/2015 | Berelejis et al. | |
| 2016/0212099 A1* | 7/2016 | Zou | H04L 63/1408 |
| 2017/0201585 A1 | 7/2017 | Doraiswamy et al. | |
| 2017/0257767 A1* | 9/2017 | Zhao | H04L 12/6418 |
| 2018/0034914 A1* | 2/2018 | Christopher | H04L 67/51 |
| 2018/0115611 A1 | 4/2018 | Lear et al. | |
| 2018/0183790 A1 | 6/2018 | Likar | |
| 2018/0270231 A1* | 9/2018 | Bauer | H04L 63/061 |
| 2019/0044948 A1* | 2/2019 | Beals | H04L 63/105 |
| 2019/0098091 A1 | 3/2019 | Shinde et al. | |
| 2019/0236672 A1* | 8/2019 | Coldwell | G06Q 30/0621 |
| 2019/0370401 A1* | 12/2019 | Grant | H04W 4/70 |
| 2020/0067938 A1* | 2/2020 | Smith | G06F 9/5072 |
| 2020/0221296 A1 | 7/2020 | Jiang et al. | |
| 2020/0267543 A1 | 8/2020 | Byers et al. | |
| 2020/0275273 A1 | 8/2020 | Smith et al. | |
| 2020/0288540 A1 | 9/2020 | Chu et al. | |
| 2020/0372700 A1 | 11/2020 | Davies | |
| 2020/0374700 A1* | 11/2020 | Smith | H04L 9/3268 |
| 2021/0099349 A1* | 4/2021 | Lee | H04L 41/0893 |
| 2021/0218793 A1 | 7/2021 | Abe et al. | |
| 2021/0351980 A1* | 11/2021 | Huffman | G06F 21/554 |
| 2022/0037041 A1* | 2/2022 | Nelson | H04L 63/107 |
| 2022/0208319 A1* | 6/2022 | Ansari | H04L 9/30 |
| 2022/0222640 A1* | 7/2022 | Mimassi | G06Q 20/3276 |
| 2022/0303282 A1 | 9/2022 | Barriga et al. | |
| 2022/0405750 A1* | 12/2022 | Fallah | H04L 9/14 |

OTHER PUBLICATIONS

Farooq et al., IoT-Connect: An Interoperability Framework for Smart Home Communication Protocols, IEEE, Dec. 4, 2019, pp. 22-29. (Year: 2019).

Shang et al., Breaking out the Cloud: Local Trust Management and Rendezvous in Named Data Networking of Things, IEEE, Apr. 21, 2017, pp. 3-13. (Year: 2017).

* cited by examiner

INTERNET OF THINGS (IoT) SYSTEMS AND METHODS

RELATED APPLICATIONS

This application claims priority to U.S. Patent Application Ser. No. 63/017,393, titled "INTERNET OF THINGS (IoT) SYSTEMS AND METHODS, filed Apr. 29, 2020, and U.S. Patent Application Ser. No. 63/180,510, titled "INTERNET OF THINGS (IoT) SYSTEMS AND METHODS, filed Apr. 27, 2021. The content of each of the aforementioned applications is incorporated by reference in its entirety.

BACKGROUND

The Internet of things (IoT) is a system of interrelated computing devices, mechanical and digital machines provided with unique identifiers and the ability to transfer data over a network without requiring human-to-human or human-to-computer interaction.

The definition of the Internet of things has evolved due to the convergence of multiple technologies, real-time analytics, machine learning, commodity sensors, and embedded systems. Traditional fields of embedded systems, wireless sensor networks, control systems, automation (including home and building automation), and others all contribute to enabling the Internet of things. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

SUMMARY

Embodiments of the present disclosure a method for creating a dynamic Internet of Things environment. The method of the present disclosure includes enabling, within a platform, an onboarding application. The method of the present disclosure further includes receiving, by the onboarding application, configuration data for a desired device to determine compatibility with a network. The method of the present disclosure further includes determining, based on a comparison between configuration data and a configuration criteria for the network, whether a compatibility threshold has been satisfied. The method of the present disclosure further includes determining, when the compatibility threshold has been satisfied, whether the desired device is compatible with the network.

The platform may be a client device. The method of the present disclosure further includes determining a context and a corresponding jurisdiction for the client device. The method of the present disclosure further includes discovering at least one other device running on the corresponding jurisdiction that manages the corresponding jurisdiction. The method of the present disclosure further includes extracting information associated with the corresponding jurisdiction of the client device.

The network is an IoT network and the jurisdiction governs the IoT network according to an authorization model. Extracting information associated with the corresponding jurisdiction may further include referencing the authorization model.

The authorization model may list a set of devices connected to the IoT network and their corresponding authority to manage the jurisdiction. The method of the present disclosure further includes receiving, by the onboarding application, data that grants the desired device a managerial role in the jurisdiction. The method of the present disclosure further includes updating the authorization model to include the desired device and the corresponding authority to manage the jurisdiction. The method of the present disclosure further includes granting the desired device the managerial role over the jurisdiction.

The authorization model may include a default setting that lists a newly added device to the IoT network as having no authority to manage the jurisdiction. The platform may be one of a client device, a cloud, and a network. The network may include a set of devices connected to the network. The application may comprise a database that includes configuration data for each of the devices connected to the network.

The method of the present disclosure may further include determining, based on the received configuration data, that the desired device would require a network bridge to be compatible with the network. The method of the present disclosure may further include prompting, within the platform, a notification that the network bridge is required for the desired device prior to being added to the network.

The platform may be a client device. The method of the present disclosure may further include determining, based on the received configuration data, that the desired device would require additional equipment to use the desired device with the network. The method of the present disclosure may further include prompting, within the client device, a notification that the additional equipment is required for the desired device prior to being added to the network. The method of the present disclosure may further include displaying one or more required additional equipment within the client device for purchase in response to a request for the display.

The method of the present disclosure may further include determining at least one alternative device is compatible with the network, in response to the compatibility threshold not being satisfied. The method of the present disclosure may further include prompting a notification, within the platform, that identifies the at least one alternative device with accompanying information about the at least one alternative device.

Receiving the configuration data for the desired device to determine compatibility with a particular network may further include scanning, by the client device, an identifier associated with the desired device.

Receiving the configuration data for the device to determine compatibility with a particular network may include detecting, by the client device, an identifier associated with the device.

The received configuration data for the desired device is in the form of a digital image. The comparison between the configuration data and the configuration criteria may further include consulting a database of the particular network that includes configuration data for a set of devices located within the particular network.

Receiving the configuration data for the desired device to determine compatibility with a particular network may include consulting an online resource.

The method of the present disclosure may further include displaying, at the client device, instructions on how to connect the device to the network.

The method of the present disclosure may further include preconfiguring, remotely, by the onboarding application, based on the received configuration data of the device, the network to allow the device to connect to the network. The method of the present disclosure may further include automatically connecting with the desired device with the network when the device is discernable by the network.

The method of the present disclosure may further include automatically registering ownership of the desired device with the manufacturer of the desired device.

The method of the present disclosure may further include receiving software update information from the manufacturer of the desired device. The method of the present disclosure may further include automatically updating the software of the desired device.

Embodiments of the present disclosure may include a method for creating a dynamic Internet of Things environment. The method of the present disclosure may further include enabling, within a platform an onboarding application, in response to detecting a desired device attempting to join a network. The method of the present disclosure may further include receiving, by the onboarding application running on the network, network configuration data for the desired device. The network may include a set of devices connected to the network, the application may include a database that includes configuration data for each of the devices connected to the network. The method of the present disclosure may further include automatically connecting the desired device to a network upon activation of the desired device and based on the received network configuration data. The method of the present disclosure may further include adding the network configuration data of the desired device to the database.

The method of the present disclosure may further include determining, by the onboarding application, a jurisdiction exists for the particular network. The method of the present disclosure may further include discovering, by the onboarding application, at least one device that manages the jurisdiction. The method of the present disclosure may further include listing, by the onboarding application, within a client device, the set of devices within the jurisdiction. The method of the present disclosure may further include automatically adding, by the onboarding application, the desired device to the jurisdiction.

The method of the present disclosure may further include determining a jurisdiction does not exist for the particular network. The method of the present disclosure may further include requesting, by the onboarding application, to create a new jurisdiction. The method of the present disclosure may further include establishing, by the onboarding application, the new jurisdiction. The method of the present disclosure may further include automatically adding, by the onboarding application, the desired device to the new jurisdiction.

The method of the present disclosure may further include providing, by the onboarding application utilizing augmented reality techniques, a digital image of the network that includes the listing of the set of devices. The digital image may be modified by an authenticated device to include device instructions to a digital image of the device installation.

The network configuration data for the desired device, received by the onboarding application, may be transmitted wirelessly from a remote location by the onboarding application running on a client device.

The database that includes configuration data for each of the devices connected to the network may be configured to be transferrable instantaneously to another IoT environment.

The method of the present disclosure may further include transferring configuration data for one device of the set of devices connected to the network to a separate network, after determining that the one device is compatible with the separate network.

The method of the present disclosure may further include detecting, by the onboarding application running on the network, the functionality of each of the devices connected to the network for mitigating effects. The method of the present disclosure may further include providing a notification when the onboarding application has detected mitigating effects of any of the devices.

The method of the present disclosure may further include consulting, by the onboarding application, an authorization model for a particular jurisdiction that includes managerial authority for the IoT environment for each of the devices. The method of the present disclosure may further include updating, automatically, by the onboarding application, based the authorization model, at least one device connected to the network.

Embodiments of the present disclosure may include an IoT system. The IoT may include a server having at least one processor and a memory communicatively coupled with the at least one processor and storing machine readable instructions that, when executed by the processor, cause the processor to enable, within a platform, an onboarding application. The processor may further discover, by the onboarding application, the context of the platform. The processor may further determine, based on the context, whether the platform is included within a jurisdiction. A set of devices may be connected to the jurisdiction and the onboarding application may include a database that includes configuration data for each of the devices connected to the network. The processor may further determine whether the platform is granted privileges for the jurisdiction. The processor may further receive, by the onboarding application, network configuration data for a desired device. The processor may further automatically connect the desired device to the jurisdiction based on the received network configuration data. The processor may further add the network configuration data of the desired device to the database.

Embodiments of the present disclosure may include an IoT system. The IoT may include a server having at least one processor and a memory communicatively coupled with the at least one processor and storing machine readable instructions that, when executed by the processor, cause the processor to enable, within a platform, an onboarding application. The processor may further discover, by the onboarding application, the context of the platform. The processor may further determine, based on the context, by the onboarding application, a jurisdiction does not exist. The processor may further establish the jurisdiction that grants the platform privileges to manage the network jurisdiction. The processor may further receive, by the onboarding application, network configuration data for a desired device. The processor may further automatically add the desired device to the established jurisdiction based on the received network configuration data. The processor may further add the network configuration data of the desired device to a database.

DETAILED DESCRIPTION OF THE EMBODIMENTS

Figure 1:
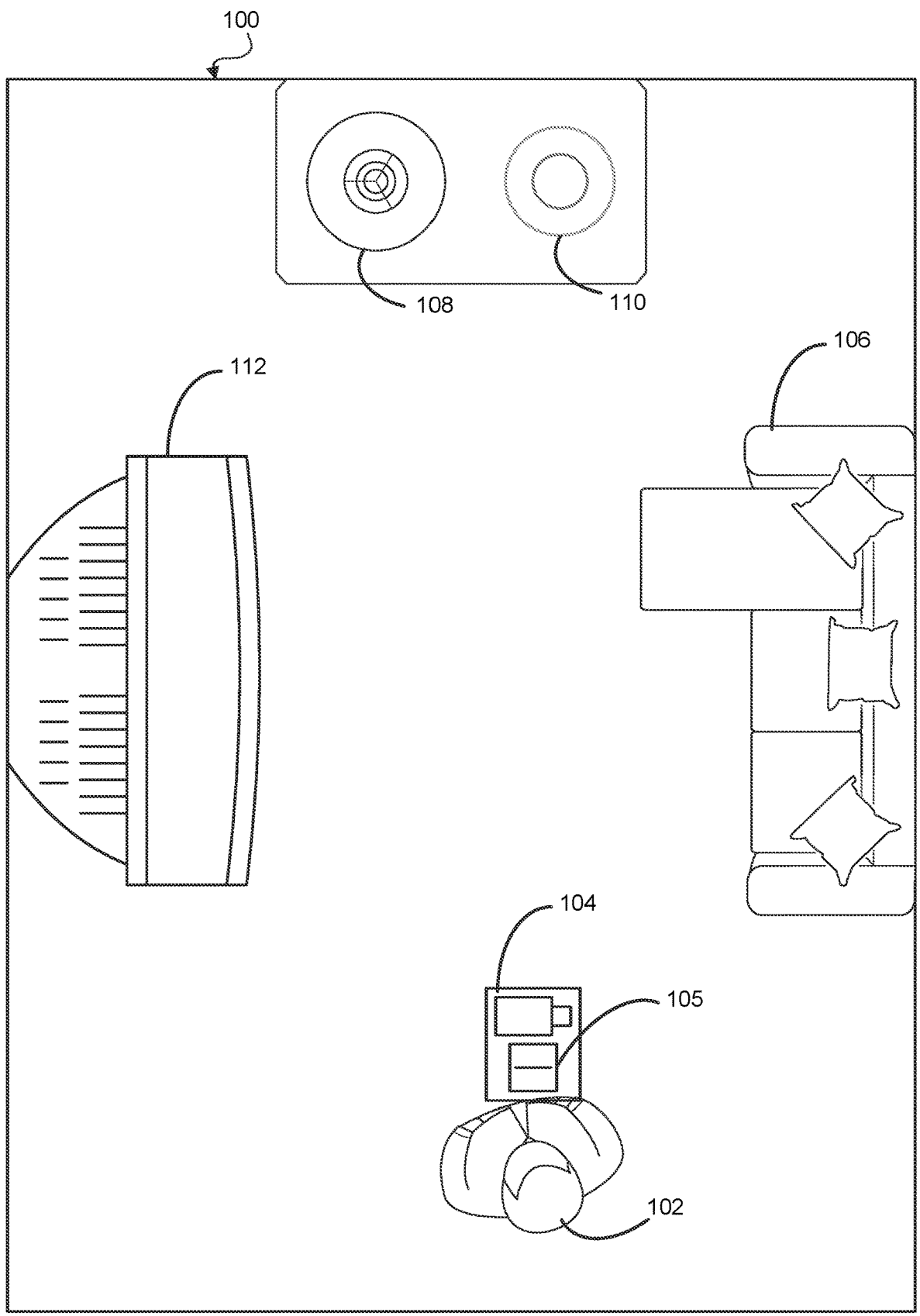
FIG. 1 shows one example at-home IoT environment that includes a set of smart devices, including a desired device, according to embodiments.

Changes may be made in the above methods and systems without departing from the scope hereof It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

One of the prevailing challenges of the Internet of Things (IoT) is that there may be many devices connected to a network from various vendors that are not compatible with one another. Sometimes, this problem can be resolved by hardware that bridges between physical network protocols and software that maps between various data models associated with each vendor. However, the sheer number of devices and permutations available on the market makes it nearly impossible for an average customer to sort this out. This causes customers to buy devices with the hope of integrating it to their smart-home IoT environment, however, the customer cannot use or figure out how to use the device and then later returns the device. This results in dissatisfied customers, increased product chain cost, lost revenue, and bad publicity.

Much of this problem can be resolved by determining whether a desired product, the customer wishes to integrate with their customer-specific IoT environment, is compatible with the customer-specific IoT environment. An IoT compatibility application can provide this information by combing a thorough knowledge of products a customer may purchase with a thorough knowledge of the customer's specific IoT environment, and then using this information to make accurate recommendations.

The IoT Compatibility Module (used herein interchangeably with application) could identify a desired device to be added to an IoT environment and have secure knowledge of the environment where the desired device will be added. In some cases, the desired device may only be added by an authenticated and authorized device (e.g. the parent's devices or other authorized devices in the home). Further, the IoT Compatibility Module may know exactly which devices are currently on the network and how they are connected even if the device implementing the IoT Compatibility Module doesn't know this. The IoT Compatibility Module may know which devices could be connected to the network in the future and exactly what bridging or other accommodation would be required to implement a desired device into the customer-specific IoT network.

The IoT Compatibility Module may use this information prior to a customer purchasing a new IoT device (e.g., "desired IoT device") to determine if the device would work with the customer's network and if any bridging is required. The intimate knowledge of the customer's network could already be incorporated into the IoT Compatibility Module. The knowledge of the desired IoT device to be potentially added could be determined by reading an identifier (e.g. a QR code or RFID) with the smart phone camera, or by analyzing a product link or description section on a web site, and then determining the compatibility of the desired IoT device with the existing customer-specific IoT environment. The IoT Compatibility Module could confirm compatibility or provide a recommendation of an alternative device that is compatible. The IoT Compatibility Module could further provide a recommendation for bridging options that would make the desired device compatible.

This IoT Compatibility Module could further provide recommendations for additional equipment to be added to the environment based on the desired device. For example, this could include determining which sound system would work with a customer's new 4K television, or which combination of services could be purchased at a lower price to give a customer the programming the customer desires. The IoT Compatibility Module would increase consumer satisfaction by providing the customer with detailed information regarding the desired device, with respect the IoT environment, as well as correct installation instructions. The IoT device may mitigate the likelihood that a customer relies on consultation or device-installation services.

Embodiments of the present disclosure may utilize an application (e.g., hardware, software, firmware, or any combination thereof), operating on a platform (e.g., a client device, such as a computer, smart phone, tablet, network, LAN, WAN, or a cloud network, etc.), to understand the details of the customer's home network and the details of the desired IoT device, that the customer wishes to purchase. The application, through functionality of the platform (e.g., a camera on a smart phone), may obtain configuration data for the desired device from scanning an identifier for the desired IoT device at a store or by ingesting the configuration data online on a product website. When recently purchased IoT devices are securely added to the home network, the IoT device may then be added to an additional secure jurisdiction on that network. The jurisdiction may control a set of IoT devices within a IoT environment within a physical boundary. Further, the jurisdiction may include an authorization model that may be in the form of a table, that includes a set of IoT devices, along with a corresponding, predefined set of roles for each of the IoT devices. The predefined roles may include a managerial role for the jurisdiction and what actions they may perform. Further, predetermined user, or default, preferences may list which devices are authenticated and/or are authorized for the jurisdiction.

Including a jurisdiction within an IoT environment will increase the IoT environment's security. This is because smart devices included within an IoT environment may include functionality that enables the devices to complete tasks beyond their normal role. For example, a smart refrigerator's normal role may include keeping certain compartments of the refrigerator at temperatures set by a user or based on which groceries are inside the refrigerator. Further, the normal role may include learning when a user most often goes grocery shopping and send them a list before that date. However, a smart refrigerator may also include functionality that, when compromised, allows a bad actor to unlock a front door and/or disable an in-home camera feed. The jurisdiction's preferences may restrict the smart refrigerator from being able to affect other devices (such as the camera feed or smart lock on a front door) by determining, based on a predefined or default preference included in the authorization model which devices are managers of the jurisdiction and which devices may perform certain roles.

Thus, the "jurisdiction" as used herein may include software, firmware, hardware, or the combination thereof that is installed on the IoT network that defines security protocols, control rights, access rights, and other managerial rights for each IoT device installed on the network. The jurisdiction may have knowledge of required vendor-specific network protocols, API calls, and other data modules to allow vendor-agnostic control of any IoT device by another one of the IoT device installed on the customer's IoT environment so long as said another IoT device has appropriate access rights. This allows the Jurisdiction to define control-rights for each IoT device to control various "scenes" or other IoT devices within the given IoT environment.

The Internet of things (IoT) is a system of interrelated computing devices, mechanical and digital machines provided with unique identifiers and the ability to transfer data over a network without requiring human-to-human or human-to-computer interaction.

The definition of the Internet of Things has evolved due to the convergence of multiple technologies, real-time analytics, machine learning, commodity sensors, and embedded systems. Traditional fields of embedded systems, wireless sensor networks, control systems, automation (including home and building automation), and others all contribute to enabling the Internet of things. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

FIG. 1 shows one example IoT environment 100 of multiple smart-home devices, e.g., a smart recliner 106, a smart lamp 108, a smart music system 110, and a smart TV 112, defining an at-home IoT environment. In some embodiments, this may be a vacation IoT environment, hotel IoT environment, etc. FIG. 1 further shows a customer 102 who recently purchased a desired IoT device 104 (e.g., a camera system) to be integrated into the at-home IoT environment which includes a jurisdiction (not shown), with an authorization model.

Figure 2:
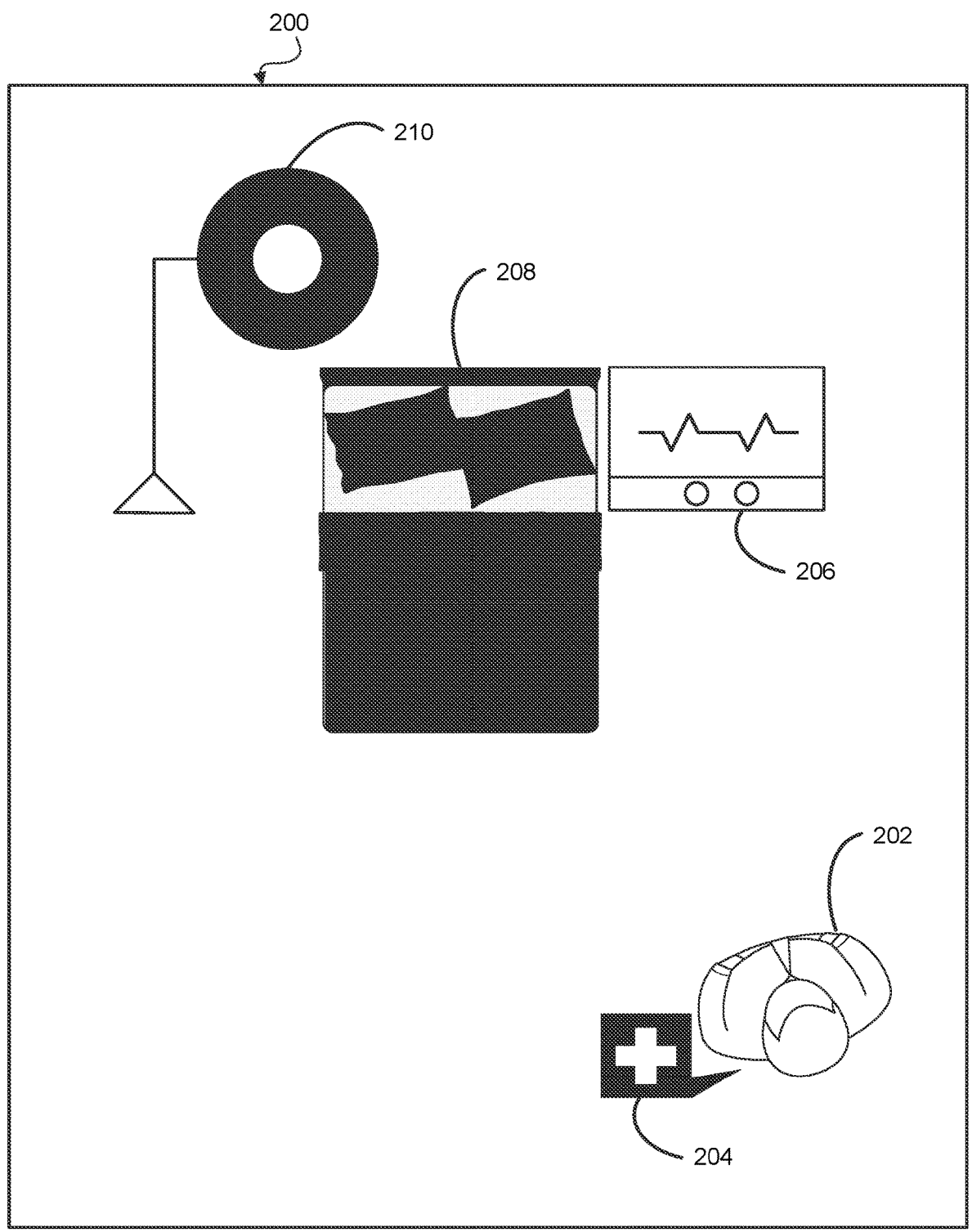
FIG. 2 shows one example medical facility IoT environment that includes a set of smart devices, according to embodiments.

FIG. 2 shows a medical facility IoT environment 200, e.g., a hospital room, that includes a hospital employee 202 giving a command 204 that alerts a smart heartrate monitor 206 to turn on, a smart hospital bed 208 to adjust to a predetermined position, and the smart lamp 210 to adjust its brightness. All of these devices 204-210 are operating on a hospital IoT environment, which includes a jurisdiction (not shown), with an authorization model.

Figure 3:
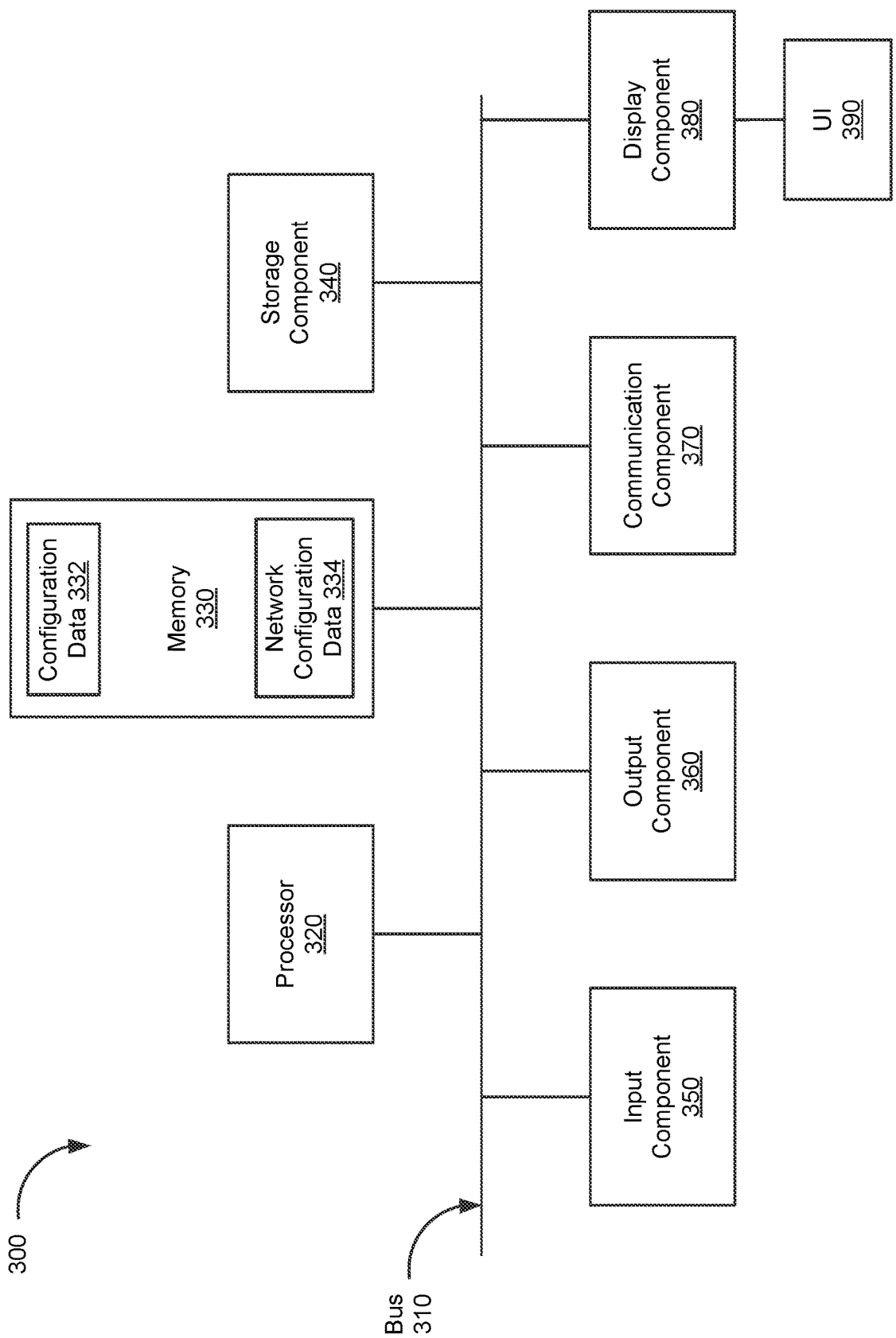
FIG. 3 shows one diagram illustrating an example computer system, according to embodiments.

FIG. 3 is an exemplary block diagram of a computing device 300 (e.g., a client device, server, cloud computing system, etc.) that may be used to perform embodiments of the present disclosure. Computing device 300 may be an example of a computing device within the IoT devices described, with reference to FIGS. 1 and/or 2, or the smart devices 804 and/or 902, with reference to FIGS. 8 and 9. For example, the computing device 300 may integrated into any of IoT devices 104-112 and/or any of the IoT devices 204-210. The computing device 300 may operate as all or part of a real or virtual server, and may be, or incorporate, any IoT device, smart device, laptop, notebook, desktop, cloud computing device, etc. In some embodiments, any, or all of 310-390 may be located on separate physical devices or virtual machines. For example, some components are located on a client device wirelessly communicating with a network within, e.g., IoT environment 100 and/or 200 to request, from memory 330 and/or storage component 340, stored on the IoT environment, network configuration data 334 of any of the IoT devices 104-112 and/or any of the IoT devices 204-210, for the processor 320 to analyze.

As shown in FIG. 3, bus 310 may provide communication between any of processor 320, memory 330, storage component 340, input component 350, output component 360, communication component 370, display component 380, and user interface (UI) 390. Processor 320 may be a programmable central processing unit capable of executing instructions stored in memory 330 for analyzing both the configuration data 332 and network configuration data 334, and then comparing the results from analyzing both sets of data to a, e.g., configuration criteria, to a compatibility threshold, to determine whether a desired IoT device is compatible with an IoT environment.

The memory 330, configuration data 332, and network configuration data 334 may also reside within the storage component 340 for longer-term storage. In some embodiments, storage component 340 may reside on an IoT environment and include the authorization model (discussed herein), and, when the IoT Compatibility Module 105 is determining whether a, e.g., client device, is authorized to scan a desired IoT device and/or then add the desired IoT device to an IoT environment, the IoT Compatibility Module 105 may reference the authorization model. In some embodiments, the authorization model may be located within the memory 330 of a, e.g., client device, cloud network, and/or in a IoT environment. Input component 350 may receive configuration data, e.g., in the form of a scanned digital image of an identifier of a desired IoT device (e.g., desired IoT device 806, with reference to FIG. 8) taken with a camera within a client device (e.g., the device 804, with reference to FIG. 8). In some embodiments, the input component may receive the configuration data 332 in the form of ingested content (e.g., a description section of for an IoT device 904 from an e-commerce website, as discussed with reference to FIG. 9).

Communication component 370 may communicate either, or both, physically or wirelessly with other computing devices, e.g., any of the IoT devices 104-112 and/or any of the IoT devices 204-210. In some embodiments, once a desired IoT device has been determined to be compatible with an IoT environment, communication component 370 may notify the IoT environment, and the corresponding jurisdiction, to be ready to add the desired IoT device to the IoT environment, upon the desired IoT device being within a proximity to the IoT environment. In some embodiments, the communication component 370 may transmit the configuration data 332 to the IoT environment to prepare to add the desired IoT device to the IoT environment. For example, the communication component 370 may transmit the configuration data 332 for the IoT device 104, prior to the customer 102 entering the home so that the IoT environment 100 is ready to add the IoT device 104 to the IoT environment when the customer 102 returns home and the IoT device 104 attempts to make a connection with the IoT environment. In some embodiments, the IoT environment 100 may add the IoT device 104 remotely, prior to the customer 102 returning home.

Display component 380 may provide one or more connections for one or more display devices. For example, the display component 380, upon the IoT Compatibility Module 105 determining that a desired IoT device (e.g., IoT device 806, with reference to FIG. 8), is compatible with an IoT environment, the display module may output a verification prong (e.g., the verification prong with reference to FIG. 8, or verification prong 906, with reference to FIG. 9). In some embodiments, the display component 380 may output a display of a bridging network in the form of a digital image, within the UI 390 of a client device, as an option for the, e.g., customer 102, to support the desired IoT device onboarding to the IoT environment. Likewise, the display component 380 may output a display of additional equipment in the form of a digital image, within the UI 390 of a client device, for the, e.g., customer 102, to support the desired IoT device onboarding to the IoT environment. In some embodiments, the display component 380 may output an alternative IoT device, with similar characteristics (such as being the same IoT device, but from a different manufacturer) as the desired IoT device, but that is compatible with the customer's 102 IoT environment, as an option for the customer 102 to purchase.

Returning to FIG. 1, an IoT Compatibility Module 105 (used herein interchangeably with "application"), running on a platform, may be enabled upon being in proximity to the IoT environment. In some embodiments, the platform may be a client device (e.g., the customer's 104 smart phone), a cloud network (not shown), or the IoT environment. The application 105 may include machine-readable instructions stored within memory (e.g., the memory 330, discussed with reference to FIG. 3) of the platform that, when executed by a processor (e.g., the processor 320, discussed with reference to FIG. 3) of the platform to implement the functionality of the application discussed herein. The functionality of the application may reside solely on the platform or may be distributed as part of a cloud-computing topology without departing from the scope hereof. In some embodiments, the application 105 may be enabled remotely, e.g., in anticipation of being in proximity to the IoT environment. In some embodiments, the application may be enabled in response to a recently purchased device, such as device 104, attempting to access the IoT environment.

The application 105 may receive configuration data (e.g., the configuration data 332, discussed with reference to FIG. 3) from the device 104 so that the device 104 may be added to the IoT environment. The application may access a database (e.g., an internal database within a client device, on a cloud, or on the IoT environment, or the memory 330) that includes IoT device network configuration data (e.g., network configuration data 334) for each of the devices connected to the network. Upon receiving the configuration data from the device 104, the application may automatically connect, and then add, the device 104 to the IoT environment. The connection and/or addition of the device 104 to the IoT environment may occur with or without customer 104 intervention. The application may then add the configuration data of the device 104 to the database, which may be stored on the customer's smart device, the cloud, or on the IoT environment. Further, the application may add the device 104 to a jurisdiction, that includes an authorization model (e.g., stored within the memory 330). The authorization model may be updated with a device 104 authorization settings, which may be based on a customer profile, that includes a list of the customer's historical settings, or the customer 102 may manually input their preferences.

In some embodiments, a jurisdiction network may reside within the IoT environment and one or more of the devices may be included within the jurisdiction. The jurisdiction may include an authorization model, stored in a database (e.g., memory 330 on a device connected to the IoT environment, the IoT environment, and/or the cloud) that includes a table with each authenticated IoT device 106-112 and their associated authorization that allows or disallows the IoT devices 106-112 to perform certain activities. For example, even though the smart music system 110 may be capable of performing activities beyond playing music, the authorization for the smart music system 110 may be limited to performing activities that are within the generic role of the device, such as playing music on command.

For example, if the smart music system 110 were to be compromised by a bad actor who attempts to control a smart lock (not shown) on the door connected to the IoT environment, the jurisdiction would reference the authorization model and disallow such an action from being performed. The authorization model may be updated manually by the customer 102 or automatically, by the application, based on historical settings or on a customer profile. For example, the customer 104 may define an authorization level for the device 104 not to adjust any controls of certain other devices, such as the smart lamp 108, but the device 104 may be able to control a setting of the recliner 106. From this, the jurisdiction would reference the authorization model when the device 104 performs any actions to determine the device 104 is authorized to perform the action. If the device 104 were to attempt to control the smart lamp 108, the jurisdiction would reference the authorization model and disallow the device 104 from controlling the smart lamp 108.

Once the device is added to the jurisdiction, the application or jurisdiction may register the device 104 to its manufacturing warranty by using the configuration data. The jurisdiction may further sign up the device 104 for any automatic software updates and monitor the functionality of the device 104 and notify the customer 104 if the device is not working correctly. The application may look up ways to fix the device 104.

Further, each of the devices 106-112 may be preconfigured to perform a "scene" upon a signal (e.g., a voice automated command). For example, upon the customer 102 coming home after work and saying "relax", the smart recliner 106 may recline, the smart lamp 108 may dim, the smart music system 110 may start playing mellow music, the smart TV 112 may power on to a channel the customer 102 enjoys watching after work, and the device 104 (the camera) may power down until the following day when the customer leaves for work. The application or jurisdiction may update the authorization model to include the device 104 to perform this or any other scene.

Returning to FIG. 2, the command 204 may be a command to prepare the room for a hospital attendant post-surgery. For example, the employee 202 may say, "Prepare for a post-heart-surgery patient." The hospital IoT environment may receive the command through one of the devices 204-210. The devices 204-210 may start performing actions, which the jurisdiction, referencing the authorization model, may allow or disallow. For example, in response to the command, the heartrate monitor 206 may adjust settings to prepare for a post-heart-surgery patient, the smart lamp 210 may dim to a level that is convenient for patient's post-surgery (e.g., according to any anesthetics the patient may have taken), and the smart bed 208 may adjust to a comfortable position for a post-heart-surgery patient. Prior to each of the devices 202-210 performing the above commands, the jurisdiction will reference the authorization model to determine whether the devices may perform the actions.

The devices 202-210 are not meant to limit the available devices that may connect to the hospital IoT environment. For example, the employee 202 may bring in a device (e.g., a wearable post heart-surgery device) for the patient to wear, that the employee 202 wishes to add to the hospital IoT environment. Upon entering, or being within a proximity to, the room 200, an application (e.g., the IoT Compatibility Module 105 discussed with reference to FIG. 1) running on a platform may be enabled. The jurisdiction for the hospital room may determine that a platform the application is running on is authenticated and may have been granted authorization to add devices to the hospital IoT environment, according to the authorization model. In some embodiments, the platform may be a client device (e.g., the employee's 202 work or personal smart device), a cloud network (not shown), or the hospital IoT network. The application may receive instructions from a memory (e.g., the memory 330, discussed with referent to FIG. 3) to execute a processor (e.g., the processor 320, discussed with referent to FIG. 3) to perform operations, both of which may be located on any of the above platforms.

The application may receive configuration data (e.g., configuration data 332) from the, e.g., wearable medical device (not shown), so that the medical device may be added to the hospital IoT environment. The application may access a database (e.g., an internal database, such as memory 330, within a client device, on a cloud, or on the IoT environment) that includes network configuration data (e.g., network configuration data 334) for each of the devices 204-210 connected to the hospital IoT environment. Upon receiving the network configuration data from the wearable medical device, the processor may compare the configuration data to the network configuration data to determine whether a compatibility threshold has been satisfied.

Upon a compatibility threshold being satisfied, application may automatically connect, and then add, the medical device to the hospital IoT environment, including the jurisdiction. The connection and/or addition of the medical device to the hospital IoT environment may occur with or without the employee 202 acting. The application may then add the configuration data (e.g., configuration data 332) of the medical device to the database (e.g., memory 330), which may be stored on the employee's smart device, the cloud, or on the hospital IoT environment. Further, the application may add the medical device to the jurisdiction, that includes the authorization model. The authorization model may be updated with medical device authorization settings, which may be based on a profile (e.g., a profile for a hospital room for post-heart-surgery patients) or the employee 202 may manually input preferences.

FIGS. 1 and 2 are not meant to be limiting examples for the present disclosure. Aspects of the present disclosure could be used in any type of environment, e.g., a manufacturing warehouse, a vacation home, an automobile, a hotel room, etc. In some embodiments, e.g., each room in a hotel may have different IoT environments, or there may be categories (e.g., suite, executive, economy, etc.), each with predetermined IoT environments, and a corresponding jurisdiction for each hotel room and each corresponding category. For example, each executive room in a hotel may have its own IoT environment, with a default jurisdiction, preprogrammed for executive rooms. In some embodiments, the jurisdictions, or the entire IoT environment, may be configurable to transfer from one hotel room to another hotel room, instantaneously, upon a command. In some embodiments, aspects of the present disclosure may utilize augmented reality to capture a digital image of the layout or blueprint of the hotel, including each IoT environment, and the corresponding jurisdictions and authorization models, for a user to easily visualize the IoT-makeup of the hotel.

Figure 4:
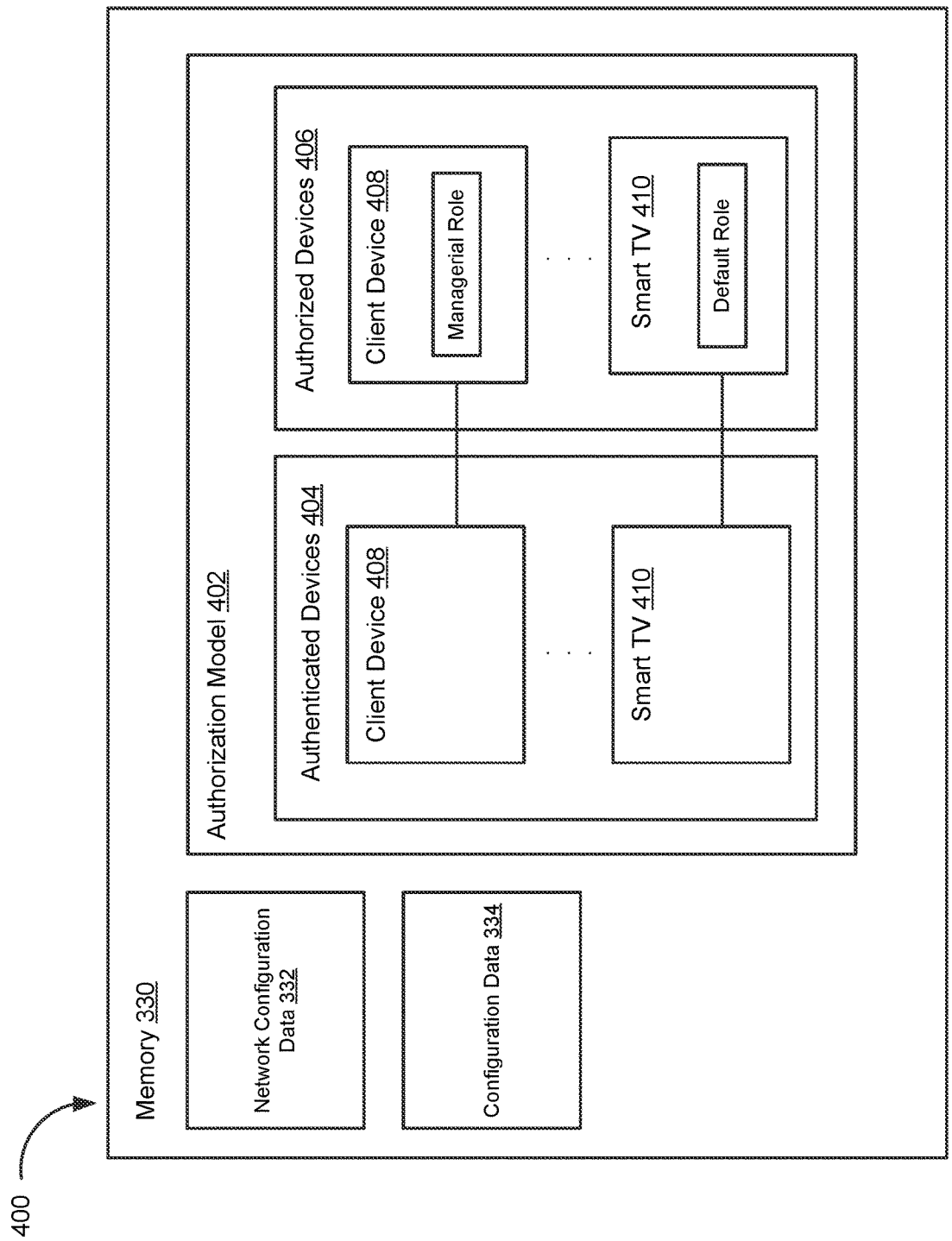
FIG. 4 shows one example memory from FIG. 3 including an authorization model, according to embodiments.

FIG. 4 shows an example memory 330 (e.g., a database) that includes the network configuration data 332, configuration data 334, and an authorization model 402. The authorization model 402 (e.g., a table), as discussed above, includes a list of authenticated devices that have been granted permission to reside on an IoT environment (e.g., the IoT environments from FIG. 1 or 2), as well as a list of authorized devices, that lists each device within the IoT environment and their corresponding authority level. For example, authenticated devices 404 includes authenticated devices client device 408 and smart TV 410 have been authenticated to join the IoT environment from FIG. 1. Further, the authorized devices 406 list includes each of the IoT devices listed within the authenticated devices 404 list and their corresponding authorization levels. For example, the client device 408 has a managerial role, which, e.g., may mean that the client device 408 may add other IoT devices to the IoT environment 100. For example, the client device 408 may have the application (e.g., IoT Compatibility Tool 105) running on the client device 408 and can assist the IoT customer 408 in determining whether a desired IoT device is compatible with the IoT environments, and then add the desired IoT device (e.g., desired IoT device 806) to join the IoT environment (e.g., IoT environment 100).

In some embodiments, the authorized devices 406 list may include the smart TV 410. The smart TV 410 may have a default role set as their authorization role. The default role may limit the smart TV 410 to a number of actions the smart TV 410 may take that does not exceed a, e.g., customer's expectations of how a smart TV would operate. For example, the smart TV may determine a user's favorite TV shows, decrease the volume or brightness at certain times of the day, etc. However, the smart TV 410 may not adjust settings of other smart devices (not shown) included within the IoT environments. For example, the smart TV 410 may not adjust a smart lamp, unlock a smart lock for a house door, turn on a smart blender, etc. This may increase the security of the IoT environment and decrease the vulnerability of the IoT environment being compromised by bad actors.

The authorization model 402 is not limited to the devices or quantity of devices shown in FIG. 4 and may include an unlimited number of devices. The authorization model 402 may reside in the memory 330, in the storage component 350, either of which may reside on a client device (e.g., client device), a cloud network, or an IoT environment (e.g., the IoT environments from FIGS. 1 and 2), or any IoT device authorized by the owner of the IoT environment, that is connected to the IoT environment. For example, an IoT environment owner (e.g. customer 102) may authorize two client devices (one for each parent, e.g.) to have a managerial role over the IoT environment.

In some embodiments, there may be more than one authorization model 402 within the memory 330. For example, the owner of the IoT environment may also be the owner of multiple IoT environments, each with a corresponding jurisdiction and a corresponding authorization model. In this embodiment, the owner may select which authorization model 402 to use for a particular task. For example, the owner (customer 102) of an IoT environment is using their client device 408 in a store (e.g., with reference to FIG. 8) to determine whether a desired IoT device 806 is compatible with a particular IoT environment. If the owner were to be an owner of multiple IoT environments, the application (e.g., the IoT Compatibility Tool) may prompt the owner to select which IoT environment the owner would like to add the desired IoT device 806 to. In some embodiments, the owner may select to add the desired IoT device 806 to more than one IoT environment.

Figure 5:
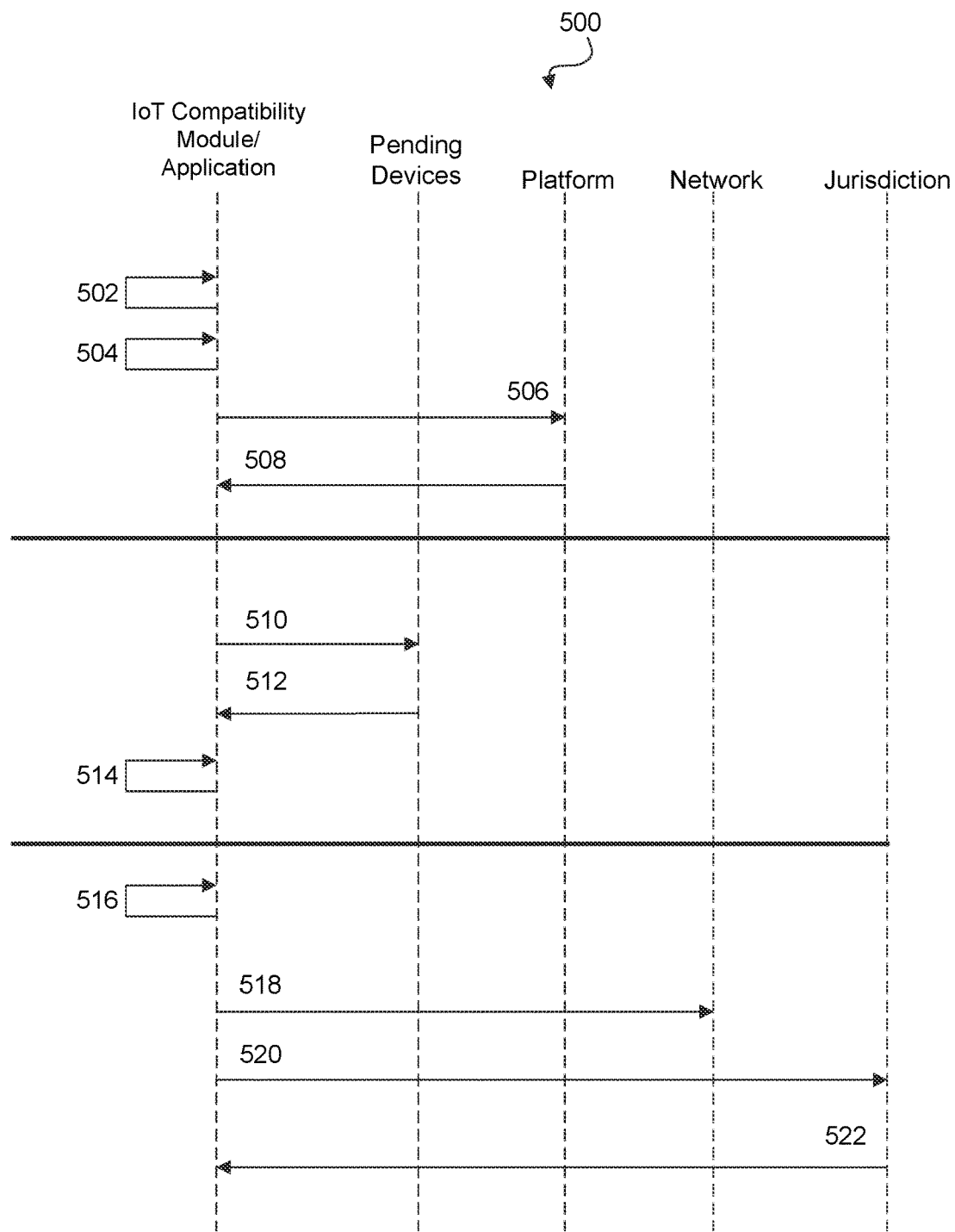
FIG. 5 shows one example process for scanning a desired smart device, with a platform, at a physical store, according to embodiments.

FIG. 5 shows an example process for determining whether a desired device is compatible with an IoT environment. FIG. 5 may be used with reference to FIGS. 8 and/or 9, where a customer is using embodiments of the present disclosure to determine whether a desired IoT device (e.g., desired IoT device 104, 806 or 904, with respect to FIGS. 1, 8, and 9, respectively) to be purchased in a physical store or online is compatible with an IoT environment. As shown in FIG. 5, an application (or platform running the application) may receive (502) an instruction to enable the application (e.g., IoT Compatibility Module 105, discussed with reference to FIG. 1) to be enabled (502). The application may be running on a platform (e.g., a smart phone). In some embodiments, the processing of the application may be on a cloud network. The application may be enabled in response to the application being manually activated within a smart device and/or to the smart device being within a proximity to a store (e.g., GPS on a device detecting the device is in proximity to an electronic store that sells IoT devices).

The application may receive an instruction to authenticate the platform (504) to determine whether the platform has authorization (e.g., by referring to authorization model 402, with reference to FIG. 4) to add a desired device to an IoT environment. In some embodiments, there may be multiple IoT environments in which to choose from. For example, there may be an at-home IoT environment, a vacation-home IoT environment, etc., and each IoT environment may have a corresponding jurisdiction or be included within the same jurisdiction. The application may receive a selection from a list of IoT environments or the application may intelligently choose which IoT environment the device will be added to.

The application may request to find a context of the platform (e.g., where the smart phone is connected, if at all) (506). For example, the context may include a cellular/LTE/5G network, home Wi-Fi network, a vacation home, a hotel room, etc. The application may then receive the context from the platform (508). For example, the application may receive the Wi-Fi, service set identifier (SSID), network name, or another contextual identifier. From this, the application may determine that the platform is in a store and the platform owner desires to purchase a device to add to a specific IoT environment associated with the platform. In some embodiments, the application may determine, from the context, that the platform is within a particular building (e.g., a house), and accessing e-commerce websites for a desired device to add to the IoT environment. Further, the application may determine, based on the authorization model (e.g., the authorization model 402, with reference to FIG. 4) for a particular jurisdiction, whether the platform is authorized and has a managerial role and can therefore add devices to a particular network.

The application may scan (not shown) an identifier of a desired device using functionality of the platform (510). For example, if the platforms is physically within a store, the platform may scan an identifier (e.g., a QR code, Universal Product Code, etc.) associated with the desired device using the platform's camera. In some embodiments, the platform may detect an identifier (e.g., an RFID tag, NFC communication, other radio-based identifiers on the packaging or physical device, etc.) associated with the desired device. In some embodiments, if the application or platform has accessed an e-commerce website, e.g., within or proximate to a building, application may receive an instruction to ingest information (e.g., specification section of the desired device online) associated with the device on the website. In some embodiments, the identifier may be a, e.g., model number, serial number, security code, validating web sites, etc. In some embodiments, the device identification, ownership status, security keys, etc. may be verified by checking with a website or other network-accessible means in a secure manner. This may be to deter theft and/or prevent individuals from fraudulently claiming to own a device.

In some embodiments, the application may receive configuration data for the desired device in response to scanning the identifier (512). The configuration data may include the desired device's operating software, hardware configuration, manufacturer, model, serial number, etc. In some embodiments, the application may consult an online resource, such as a website, database, or intelligent resource to determine or verify the received configuration data. The application may determine whether the desired device is compatible with an IoT environment. In some embodiments, the application may utilize a processor to compare the received configuration data to configuration criteria for the IoT environment. For example, the platform may include details (e.g., the manufacturer of a number of devices currently connected to the IoT environment, software, hardware, etc.) of the IoT environment obtained by last joining the IoT environment. The application may develop a configuration criteria based on what specifications are required for a device to join the IoT environment. The processor may compare the received configuration data of the scanned device to the configuration criteria for the IoT environment, and then determine whether the scanned device is compatible with the IoT environment. In some embodiments, the configuration data may be compared to a network configurations data, and the results of the comparison may be compared to a configuration criteria. From this, the processor may determine whether a compatibility threshold has been satisfied.

As shown in FIG. 5, the application may display a message, within the platform, that the scanned device is compatible with the IoT environment (514). In some embodiments, the application may receive a request to preconfigure the IoT environment to add the scanned device upon the scanned device connecting to the IoT environment (516). In response to this request, the application may remotely transmit an instruction, along with the configuration data, to the IoT environment and/or to a jurisdiction for the IoT environment, that the IoT environment and jurisdiction securely add the scanned device (518) (520). In response to the transmitted instructions, the IoT environment and the jurisdiction may pre-authorize onboarding of the scanned device when the scanned device is turned on proximate to the IoT environment (522). In some cases, the scanned device will be added to the IoT environment and jurisdiction remotely over Wi-Fi.

Figure 6:
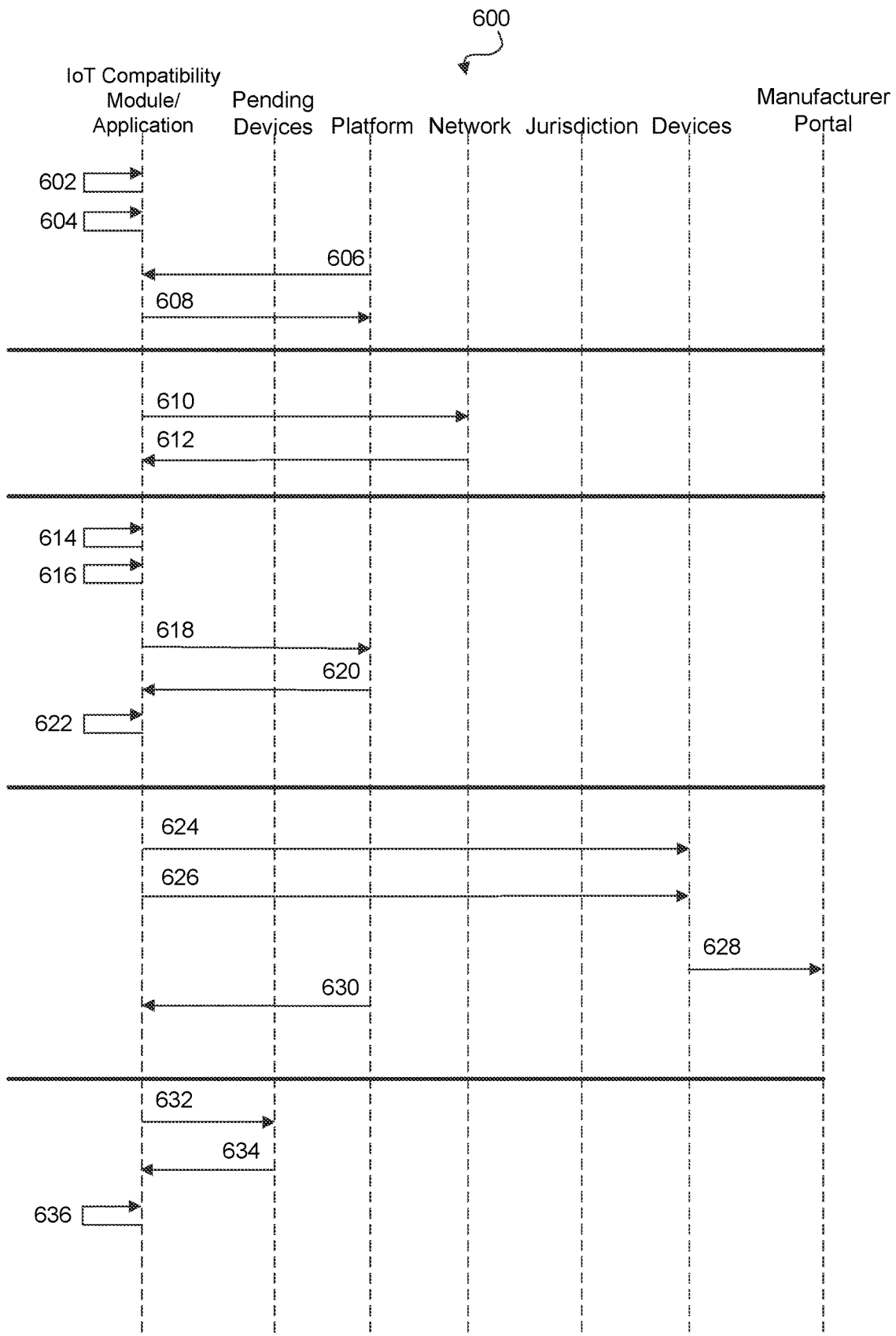
FIG. 6 shows one example process for adding a desired smart device to an IoT environment, according to embodiments.

FIG. 6 shows a process 600 for establishing and defining a jurisdiction. The operations (602)-(608) are substantially similar to the operations (502)-(508) described with reference to FIG. 5. In this embodiment, a, e.g., platform, may be implemented at a customer's home and an application (e.g., IoT Compatibility Module 105, discussed with reference to FIG. 1) may be running on the platform (e.g., a smart device). The application may connect to a network of the IoT environment and attempt to find a jurisdiction (610). The network may respond to the application with information regarding whether a jurisdiction exists (612).

Operations (614)-(622) detail steps for establishing a jurisdiction if a jurisdiction does not exist. The application may prompt a display that no jurisdiction is currently established (614). The application may receive a request to establish a new jurisdiction (616) that includes the platform. In some embodiments, the request may not be in response to there being no established jurisdiction. The application may then set up a new jurisdiction (618), which may include determining the physical parameters of the jurisdiction, e.g., where the jurisdiction applies (e.g., a home, vacation home, room within a home—garage, medical facility, manufacturing plant) and creating an authorization model (e.g., the authorization model 402, with reference to FIG. 4), as discussed above, for the particular jurisdiction. In some embodiments, the physical parameters may be manually inputted into the application (e.g., within, or in proximity to, or surrounding, a building) of the jurisdiction and the authorization model. In some embodiments, the application may include default settings for establishing a jurisdiction that includes default physical parameters and a default authorization model. The application may add the platform to the jurisdiction (620) with a corresponding authentication (e.g., managerial authority over the platform), and a message confirming this may displayed, e.g., with a user interface of the platform (622).

Operations (624)-(630) detail steps in the scenario if a jurisdiction is in existence. The application may authenticate the jurisdiction (624). Then, the application may send a command to the jurisdiction to get all of the devices that are listed within the jurisdiction (626). In response, the jurisdiction may list all of the devices (628). The platform may then send the application contextual information regarding the IoT environment to prepare the application for onboarding any pending devices to the IoT environment (630). For example, the application may receive the Wi-Fi, service set identifier (SSID), network name, or other contextual identifiers of the IoT environment from the platform.

The following operations (632)-(636) may be conducted separately from, or following, operations (602)-(630), or following operations from FIG. 5. For example, the following operations (632)-(636) may be conducted following operation (516) from FIG. 5, once the customer (e.g., customer 102) has returned home from purchasing a scanned device (e.g., desired IoT device 104) at the store. Each of the scanned devices may be added to the jurisdiction (632) and (634). The application may then prompt a notification, e.g., within a UI of the platform, that the scanned devices have been added to the jurisdiction and/or the IoT environment (636).

Figure 7:
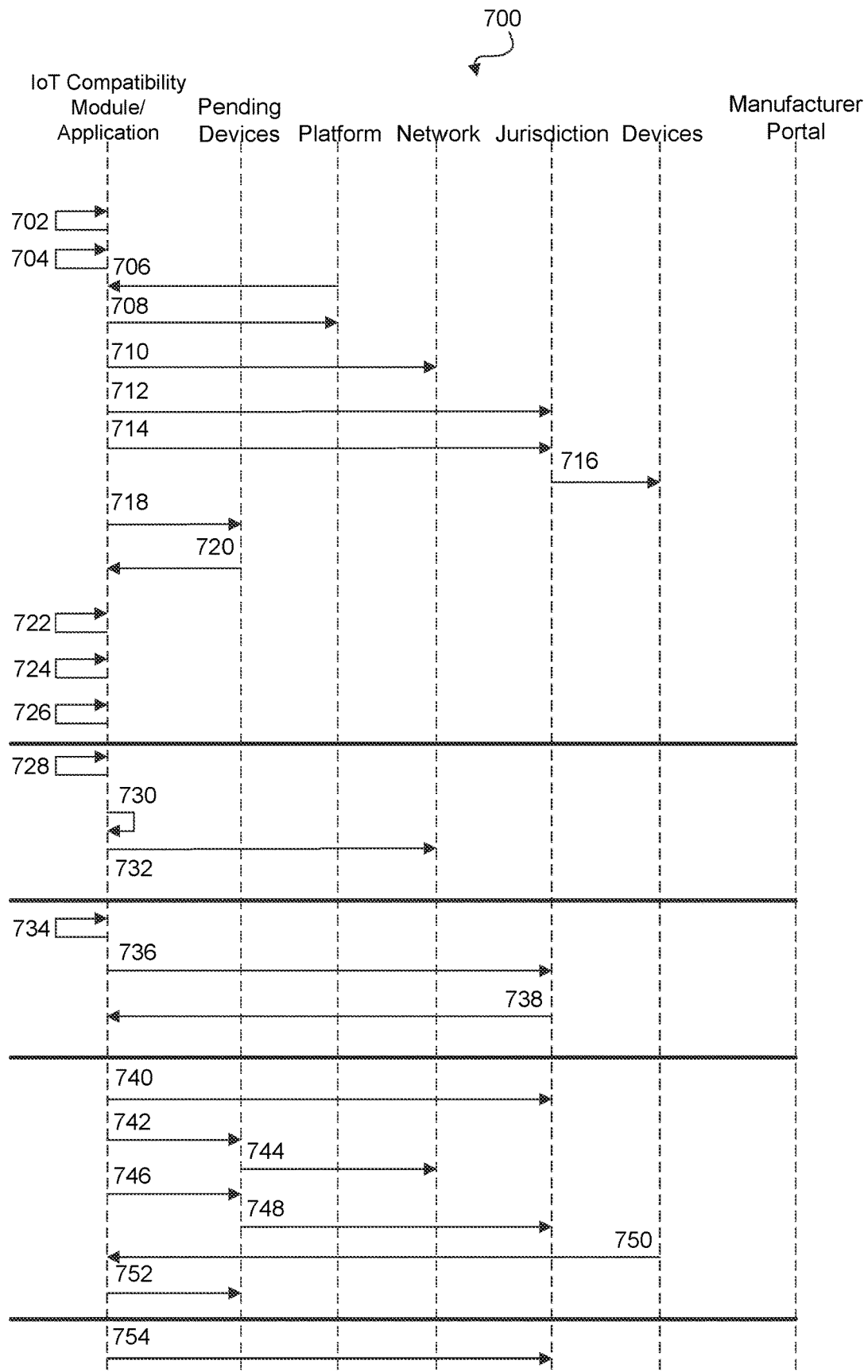
FIG. 7 shows one example process for scanning, and then adding, a desired smart device to an IoT environment, according to embodiments.

FIG. 7 shows a device onboarding process 700 that incorporates portions discussed with reference to FIGS. 5 and 6. In this embodiment, an application (e.g., IoT Compatibility Module 105, discussed with reference to FIG. 1) may be running on a platform (e.g., a smart device). Some embodiments of FIG. 7 may be, in part, directed to registering newly added devices of an IoT environment to each of the device's manufacturer's warranty list. The operations (702)-(710) are substantially similar to the operations (602)-(610) described with reference to FIG. 6. Further, operations (712)-(716) of FIG. 7 may be substantially similar to operations (624)-(628) of FIG. 6. That is, in this embodiment, a jurisdiction may exist on the IoT environment.

The application may send a request to locate any pending device (e.g., the purchased device 104 with reference to FIG. 1) attempting to join the IoT environment (718). The pending devices may transmit a list that includes all of the pending devices to the application (720). The application may then prompt an inquiry, e.g., within a UI of the platform, to determine whether the application should begin to onboard the pending devices to the IoT environment and/or the jurisdiction (722). The application may receive an option for the application or jurisdiction to add and then register the devices to their respective manufacturers, etc. (724). The application may display a list of the pending devices, and associated information of each device, within the platform and/or then receive a request to select at least one of the pending devices to add to the, e.g., jurisdiction (726). In some embodiments, the application may automatically select to add all of the devices after expiration of a predetermined set time.

As shown in FIG. 7, in some embodiments the application may receive a request to register the devices with their manufacturer's warranty, any associated software updates, etc. (728). The application may parse each of the added devices for, e.g., registration URLs to identify any information regarding registering the devices with the manufacturer (730). The application may register the one or more of the added devices with their respective manufacturer(s) (732).

In some embodiments, the application may receive a request to, or the application may automatically, add one or more of the devices to the jurisdiction (734). The application may then confirm the platform is authorized to add one or more of the devices to the jurisdiction (736) by referencing an authorization model (e.g., authorization model 402, with reference to FIG. 4). The jurisdiction may respond to the application with a confirmation that the platform is authorized to add the devices (738) by referencing the authenticated device list 404 (e.g., the client device 408) and the corresponding authorized device list 406 (e.g., that the client device 408 has a managerial role), within the authorization model 402. The authorization confirmation may include network and jurisdiction details, or the details may be delivered to the application in discrete messages.

The application may then request network provisioning credential and details, and jurisdiction credentials and details, from the jurisdiction (740). The application may request network provisioning credentials and details from each of the pending devices (742). The pending devices may request the network to authenticate the each of the device's network provisioning credentials and details (744). The application may onboard each of the pending devices with the jurisdiction's credentials and details (746). Each of the pending devices may then be onboarded to the jurisdiction with the corresponding jurisdiction credentials and details (748). The jurisdiction may transmit a message to the application that each of the devices have been onboarded to the jurisdiction (750). In some embodiments, the application may remove the devices from the list of pending devices (752). The application may then access any of the devices on the jurisdiction (754).

Figure 8:
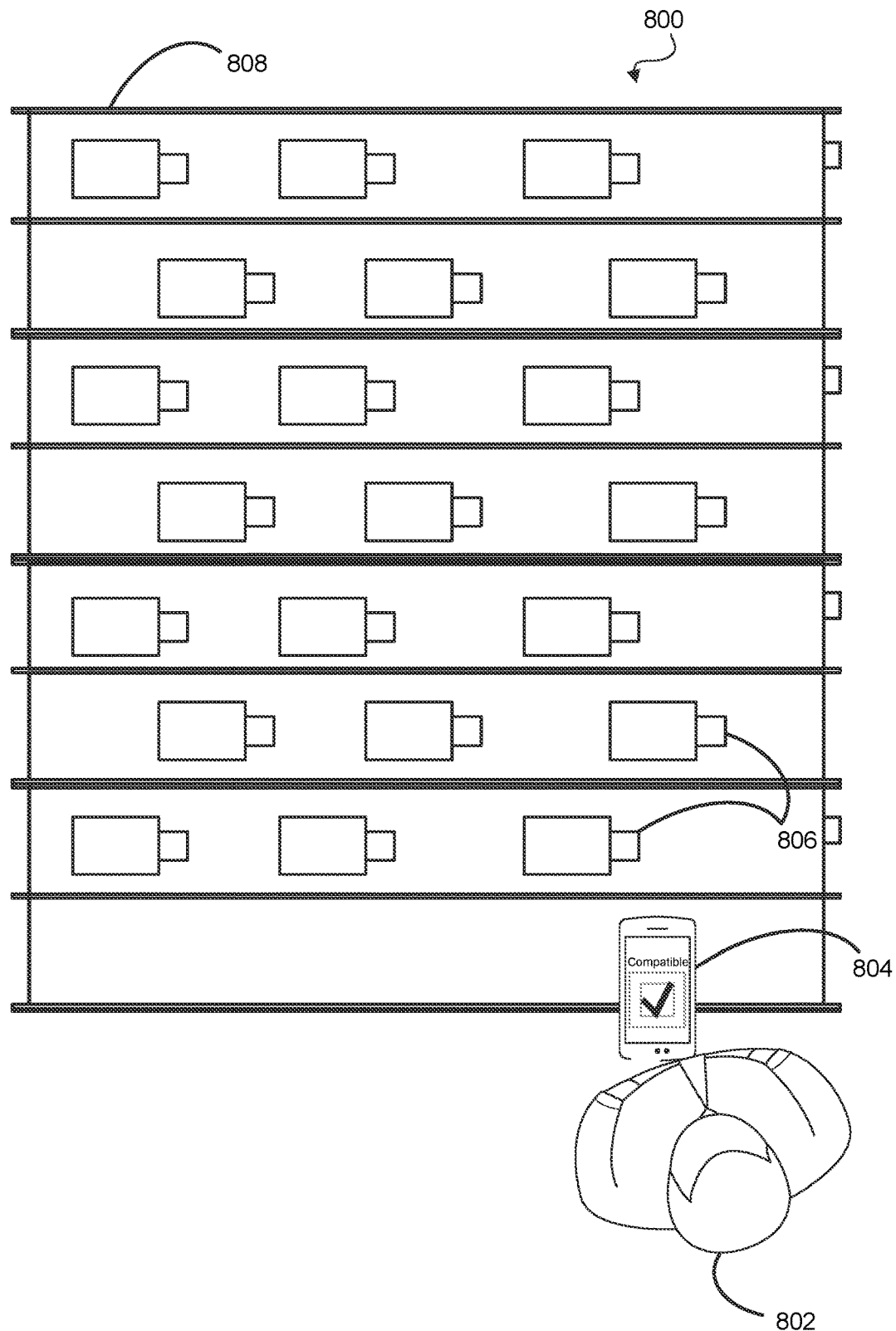
FIG. 8 shows one example illustration for determining whether a desired device is compatible with an IoT environment by scanning a desired device at a physical store, according to embodiments.

FIG. 8 shows a scenario 800 of a customer 802 using a smart device (804) to capture, e.g., with the smart device's 804 camera, an identifier associated with a desired device 806. In some embodiments scenario 800 may be a visual of a store with a shelf 808 displaying more than one of the desired device 806. A platform (e.g., the customer's 102 smart device) (with reference to at least FIG. 1) may receive an indication of a selection, by the customer 802, of a feature within the application (e.g., the IoT Compatibility Module 105, with reference to at least FIG. 1) running on the platform to determine the compatibility of the desired device 806 with the customer's 802 at-home IoT environment. The application may utilize the smart device's 804 camera, e.g., to capture an identifier, e.g., a QR code, associated with the desired device 806. The application may then receive configuration data, from capturing the identifier, of the desired device 806, and then compare the configuration data to a configuration criteria associated with the at-home IoT environment. Upon the comparison satisfying a compatibility threshold, the application may prompt the smart device 804 to prompt a display within the user interface that says, "Compatible", along with a graphical display, such as a check mark, as can be seen in FIG. 8.

The application may determine additional equipment may be purchased so that the desired device is compatible with the IoT environment, and then display the additional equipment within the user interface of the smart device 804. In some embodiments, the application may determine that a network bridge is required for the desire device 806 to be compatible with the IoT environment. The application may prompt a notification that includes a message within the user interface of the smart device 804 that a bridge is required before the desired device 804 may be added to the IoT environment.

Figure 9:
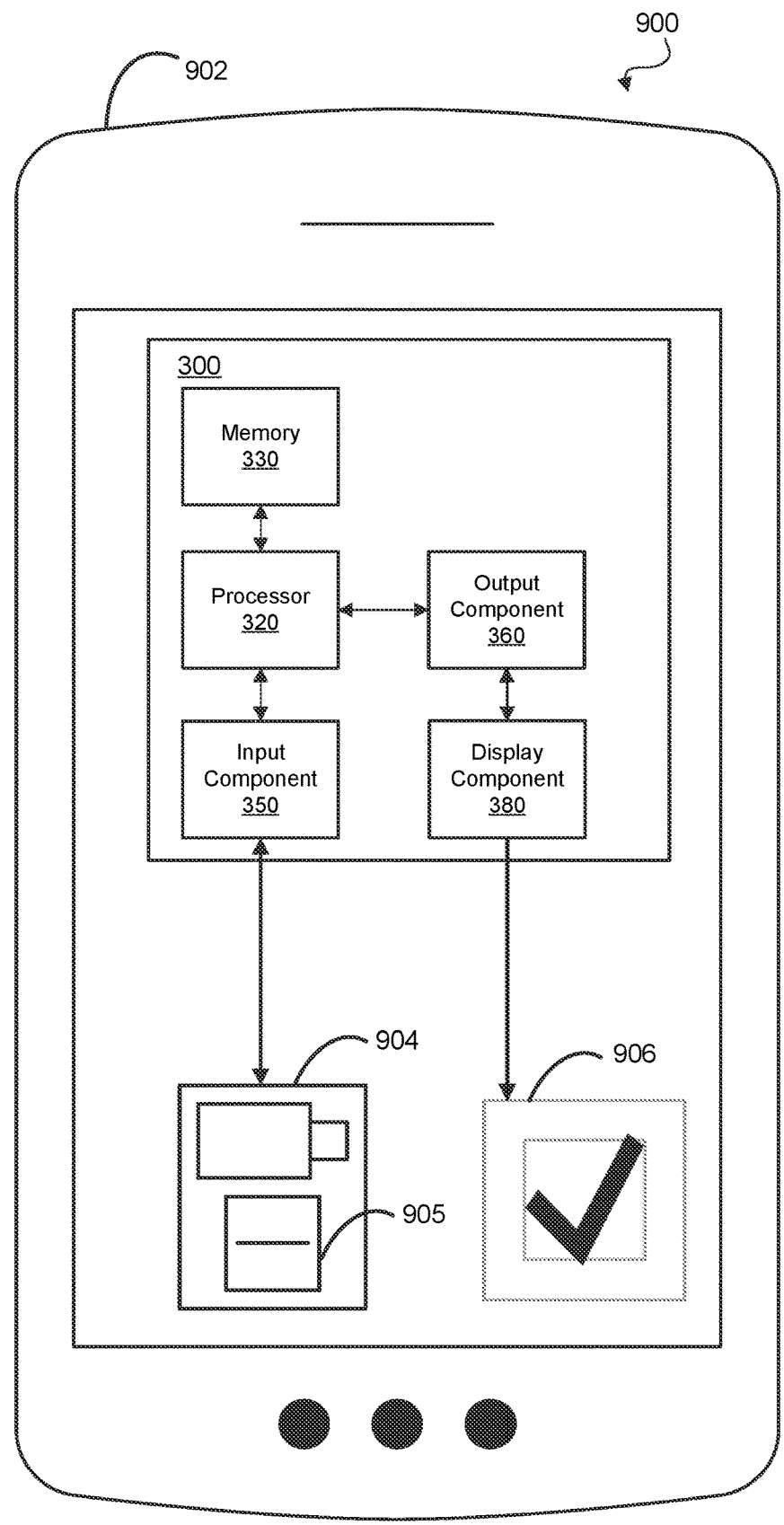
FIG. 9 shows one example illustration for determining whether a desired device is compatible with an IoT environment by ingesting content from a website, according to embodiments.

FIG. 9 shows a scenario 900 of using a smart device 902 to shop for a desired device 904 (e.g., an e-commerce website showing a digital display of the desired device 104) online. The smart device may include embodiments from the exemplary computing device 300 (described with reference to FIG. 3). The smart device 902 may display a digital image of a desired device 904 (e.g., a digital image of the smart home-monitoring camera 104, with reference to FIG. 1), along with a check mark 906 that indicates the IoT Compatibility Module 905 (application) has determined the desired device is compatible with a customer's IoT environment (e.g., the IoT environments, 100, 200). In some embodiments, an application 905 running on a platform (e.g., the smart device 902) may analyze an identifier associated with the desired product 904 to collect configuration data for the desired device 904. For example, the identifier may include a specification section within the desired device's description section on an e-commerce website.

The application 905 may transmit the configuration data to the input component 350 to compare the configuration data to a configuration criteria, that may include network configuration data (e.g., network configuration data 334) stored within, e.g., memory 330, to determine whether the desired IoT device 904 is compatible with the IoT environment. The processor 320 may compare the configuration data 330 with the network configuration data 334, and consult a configuration criteria, also stored, e.g., within the memory 330, to determine whether the configuration data 332 has satisfied a compatibility threshold. Upon the comparison satisfying a threshold, the output component 360 may generate a prompt for the display component 380 to display within the smart device 902 user interface a check mark 906, indicating that the desired IoT device 904 is compatible with the IoT environment.

In some embodiments, the display component 380 may output a display, rather than the check mark 906, of a bridging network in the form of a digital image, within the user interface of the client device 902, as an option for the, e.g., customer 102, to support the desired IoT device 904 onboarding to the IoT environment. Likewise, the display component 380 may output a display of additional equipment, rather than the check mark 906, in the form of a digital image, within the user interface of the client device 902, for the, e.g., customer 102, to support the desired IoT device 904 onboarding to the IoT environment. In some embodiments, the display component 380 may output an alternative IoT device, rather than the check mark 906, with similar characteristics (such as being the same IoT device, but from a different manufacturer) as the desired IoT device 904, but that is compatible with the customer's 102 IoT environment, as an option for the customer 102 to purchase.

In some embodiments, the computing device 300 may not be running within the smart device 902. In some embodiments, the computing device 300, or some components of the computing device 300, may be on a server, on a cloud network, or within various devices of an IoT environment, e.g., within one or more of the IoT devices 106-112 or 206-210, with reference to FIGS. 1 and 2. In some embodiments, more than the components shown within FIG. 9 may be running on the smart device 902, a server, cloud network, or various devices of an IoT environment. The displayed components are meant as an illustration of one or more embodiments.

In some embodiments, the compatibility threshold may not be satisfied. The application may determine additional equipment may be purchased or a network bridge is necessary so that the desired device is compatible with the IoT environment, and then display the additional equipment or a prompt that a network bridge is required for compatibility with the IoT environment within the user interface of the smart device 902. In some embodiments, the application may determine that a network bridge is required for the desire device 904 to be compatible with the IoT environment. The application may prompt a notification that includes a message within the user interface of the smart device 902 that a bridge is required before the desired device 902 may be added to the IoT environment.

Figure 10:
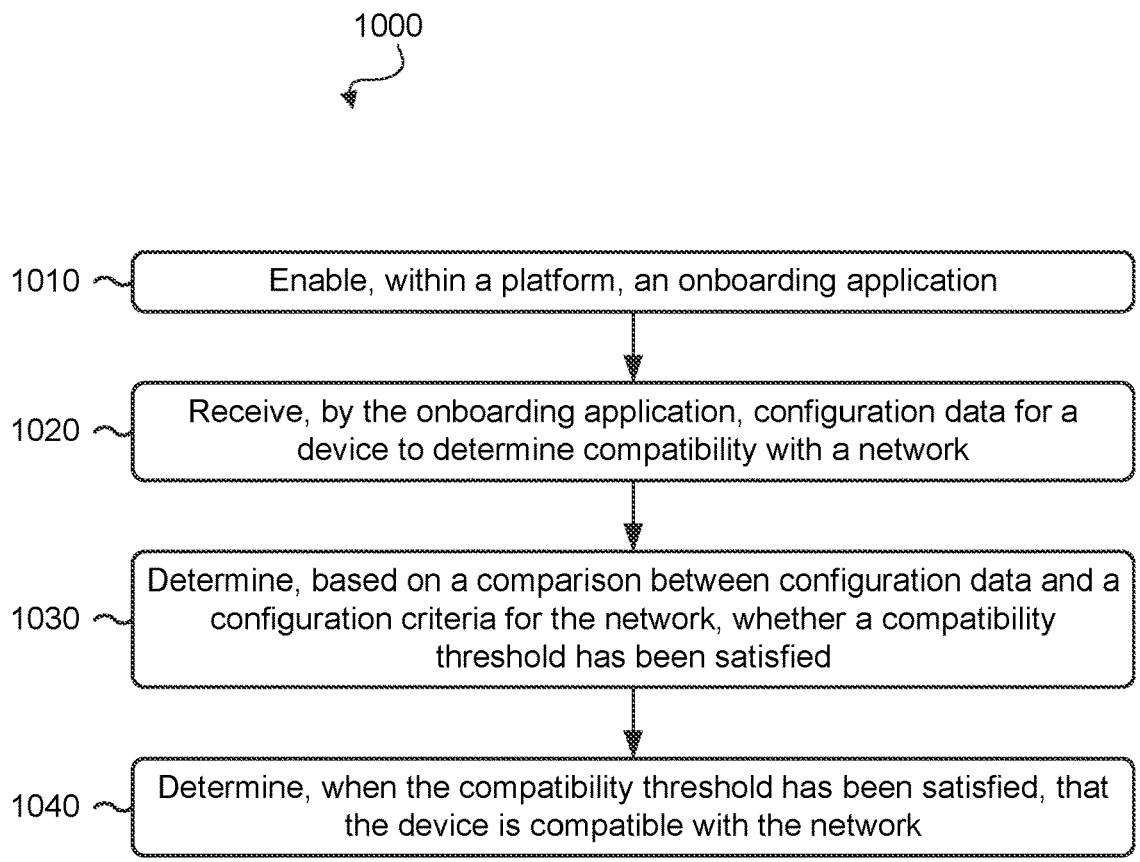
FIG. 10 shows one example method for determining whether a desired device is compatible with an IoT environment, according to embodiments.

FIG. 10 is a flowchart of an example process 1000 associated with determining whether a desired device is compatible with an IoT environment. In some implementations, one or more process blocks of FIG. 10 may be performed by an onboarding application (e.g., the application of FIGS. 1-9 and/or IoT Compatibility Module described in FIGS. 5-7) running on a platform (e.g., a client or customer device, a cloud, or a network associated with an IoT environment). In some implementations, one or more process blocks of FIG. 10 may be performed by an application running on another device or a group of devices separate from or including the platform.

As further shown in FIG. 10, process 1000 may include receiving configuration data for a desired device to determine compatibility with a network (block 1020) of, e.g., a particular IoT environment. For example, the onboarding application may receive configuration data for a desired device to determine compatibility with a network, as described above. The network may be an IoT network or IoT environment include a set of connected devices, e.g., as discussed above with reference to the smart home IoT environment discussed with reference to FIG. 1 or the hospital room smart IoT environment discussed with reference to FIG. 2, e.g. In some embodiments, the desired device may be desired IoT device 806 and the onboarding application may be running on the smart device 804.

As further shown in FIG. 10, process 1000 may include determining, based on a comparison between configuration data and a configuration criteria for the network, whether a compatibility threshold has been satisfied (block 1030). For example, the onboarding application may determine, based on a comparison between configuration data and a configuration criteria for the network, whether a compatibility threshold has been satisfied, as described above.

As further shown in FIG. 10, process 1000 may include determining, when the compatibility threshold has been satisfied, whether the desired IoT device is compatible with the network (block 1040). For example, the onboarding application may determine, when the compatibility threshold has been satisfied, whether the desired IoT device is compatible with the network, as described above. For example, determining whether the desired device is compatible with the network may include, e.g., determining whether the desired IoT device (e.g., the desired IoT device 806, with reference to FIG. 8) is compatible with the IoT environment discussed in FIG. 1.

Process 1000 may include additional implementations, such as any single implementation or any combination of implementations described below and/or in connection with one or more other processes described elsewhere herein. In a first implementation, the platform is a client device, e.g., the smart device 804, with reference to FIG. 8. The method may further comprise the onboarding application determining a context and a corresponding jurisdiction for the client device. For example, the context of the client device may provide information regarding whether the client device is included within a jurisdiction, as discussed above. The method may further include the onboarding application discovering at least one other device running on the jurisdiction that manages the jurisdiction. The method may further include extracting information associated with the jurisdiction of the client device. In a second implementation, alone or in combination with the first implementation, the network is an Internet of Things (IoT) network, and the jurisdiction governs the IoT network according to an authorization model (e.g., the authorization model 402, with reference to FIG. 4). The onboarding application may reference the authorization model to extract information associated with jurisdiction, such as if the client device is authorized, e.g., by the authorized device list 406, to add additional devices to the IoT environment.

In a third implementation, alone or in combination with one or more of the first and second implementations, the authorization model lists a set of devices connected to the IoT environment in an authenticated device list 404 and their corresponding authority to manage the jurisdiction in an authorized devices list 406. Further, the onboarding application may receive data that grants the desired IoT device a managerial role in the jurisdiction and then update the authorization model to include the desired IoT device and the corresponding authority to manage the jurisdiction (e.g., the managerial role of the client device 408, within the authorized device list 408, with reference to FIG. 4). The onboarding application may grant the desired IoT device the managerial role over the jurisdiction.

In a fourth implementation, alone or in combination with one or more of the first through third implementations, the authorization model includes a default setting (e.g., the default role for the smart TV 410, within the authorized device list 406) that lists a newly added device to the IoT network as having no authority to manage the jurisdiction. In a fifth implementation, alone or in combination with one or more of the first through fourth implementations, the platform is one of a client device, a cloud, and a network. In a sixth implementation, alone or in combination with one or more of the first through fifth implementations, the network includes a set of devices connected to the network, the application comprises a database that includes configuration data for each of the devices connected to the network.

In a seventh implementation, alone or in combination with one or more of the first through sixth implementations, process 1000 may include the onboarding application determining, based on the received configuration data, that the desired IoT device would require a network bridge to be compatible with the network; and, then prompting, within the platform, a notification that the network bridge is required for the desired IoT device prior to being added to the network. In an eighth implementation, alone or in combination with one or more of the first through seventh implementations, the onboarding application may determine, based on the received configuration data, that the desired IoT device would require additional equipment to use the desired IoT device with the network. The onboarding application may prompt, within the client device, a notification that the additional equipment is required for the desired IoT device prior to being added to the network. The onboarding application may display one or more required additional equipment within the client device for purchase in response to a request for a display.

In a ninth implementation, alone or in combination with one or more of the first through eighth implementations, process 1000 may include the onboarding application determining at least one alternative device is compatible with the network, in response to the compatibility threshold not being satisfied. The onboarding application may prompt a notification, within the platform, that identifies the at least one alternative IoT device with accompanying information about the at least one alternative IoT device. In a tenth implementation, alone or in combination with one or more of the first through ninth implementations, the onboarding application may receive the configuration data for the desired IoT device to determine compatibility with the particular network further comprises scanning an identifier associated with the desired IoT device.

In an eleventh implementation, alone or in combination with one or more of the first through tenth implementations, the onboarding application may receive the configuration data for the device to determine compatibility with the particular network, and then detect an identifier associated with the device. In a twelfth implementation, alone or in combination with one or more of the first through eleventh implementations, the received configuration data for the desired IoT device is in the form of a digital image.

In a thirteenth implementation, alone or in combination with one or more of the first through twelfth implementations, the comparison between the configuration data and the configuration criteria may include the onboarding application consulting a database of the particular network that includes configuration data for a set of devices located within the particular network (e.g., the IoT environment). In a fourteenth implementation, alone or in combination with one or more of the first through thirteenth implementations, the onboarding application may receive the configuration data for the desired IoT device to determine compatibility with the particular network includes consulting an online resource.

In a fifteenth implementation, alone or in combination with one or more of the first through fourteenth implementations, the onboarding application may display instructions on how to connect the device to the network. In a sixteenth implementation, alone or in combination with one or more of the first through fifteenth implementations, process 1000 includes the onboarding application preconfiguring, remotely, by the onboarding application, based on the received configuration data of the device, the network to allow the device to connect to the network, and then automatically connecting with the desired device with the network when the device is discernable by the network.

In a seventeenth implementation, alone or in combination with one or more of the first through sixteenth implementations, process 1000 may include the onboarding application automatically registering ownership of the desired IoT device with the manufacturer of the desired IoT device. In an eighteenth implementation, alone or in combination with one or more of the first through seventeenth implementations, process 1000 may include the jurisdiction or the onboarding application receiving software update information from the manufacturer of the desired IoT device, and then automatically updating the software of the desired IoT device. In some embodiments, the application may receive recall information for the desired IoT device, from the manufacturer, and display this information in the form of a digital image, e.g., within a user interface of the client device.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
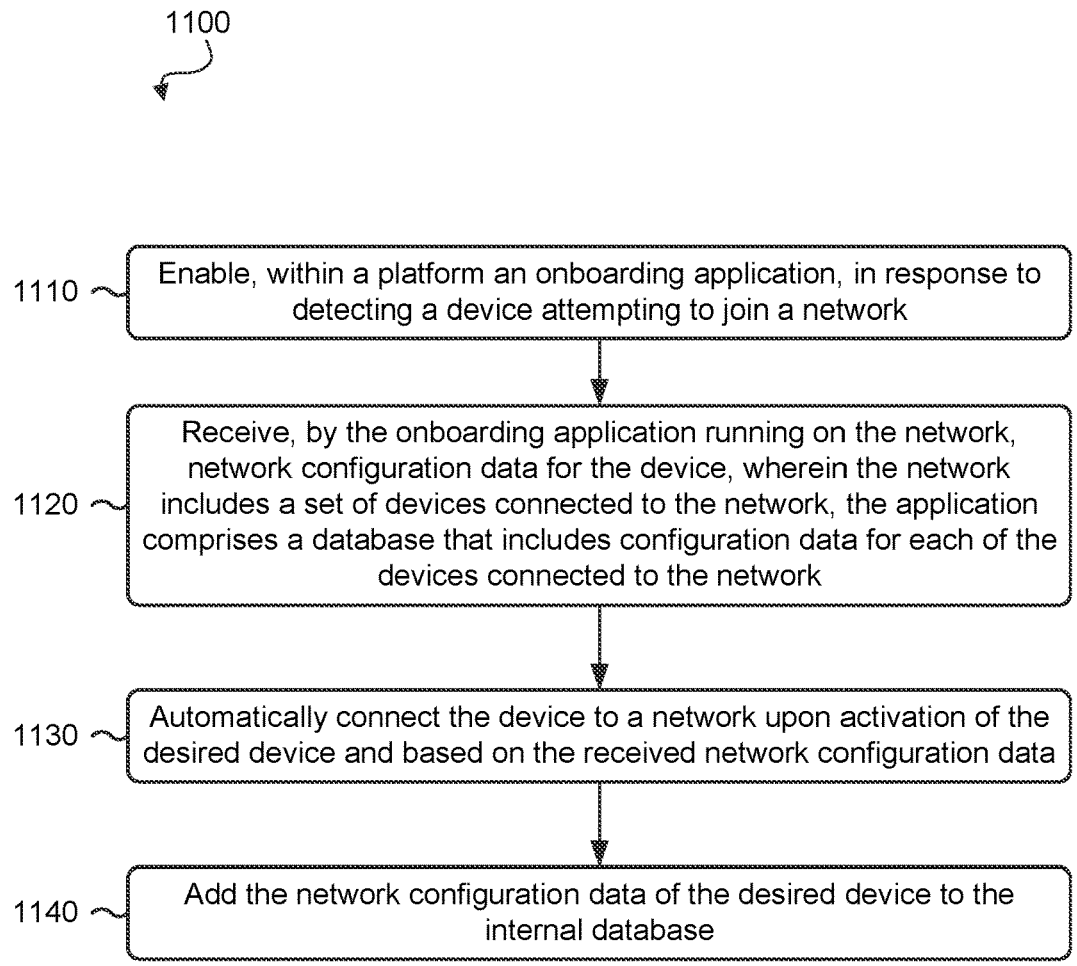
FIG. 11 shows one example method for adding a desired smart device to an IoT environment, according to embodiments.

FIG. 11 is a flowchart of an example process 1100 associated with adding a desired IoT device to an IoT environment. In some implementations, one or more process blocks of FIG. 11 may be performed by an onboarding application (e.g., the application of FIGS. 1-9 and/or IoT Compatibility Module described in FIGS. 5-7) running on a platform (e.g., a client or customer device, a cloud, or a network associated with an IoT environment). Process 1100 may be read with reference to FIG. 1-9, and include any embodiment, or device, described within those Figs. In some implementations, one or more process blocks of FIG. 11 may be performed by another device or a group of devices separate from or including the onboarding application.

As shown in FIG. 11, process 1100 may include enabling, within a platform, an onboarding application, in response to detecting a desired device attempting to join a network (block 1110). For example, the onboarding application may enable, within a platform an onboarding application, in response to detecting a desired IoT device attempting to join a network, as described above. For example, the desired IoT device may be desired IoT device 806 attempting to join an IoT environment (such as described with reference to FIG. 1-10) after the customer 102 has brought the desired IoT device 806 home to an at-home IoT environment. In some embodiments, the desired device may be the device 104 to be added to the smart home IoT environment described with reference to FIG. 1 or a device to be added to the medical IoT environment described with reference to FIG. 2. In some embodiments, the application may be manually enabled.

As further shown in FIG. 11, process 1100 may include onboarding application receiving network configuration data for the desired IoT device. The network may be a network for an IoT environment and include a set of devices connected to the network. The onboarding application may include a database that includes configuration data for each of the devices connected to the network (block 1120). For example, the onboarding application may receive network configuration data for the desired device.

As further shown in FIG. 11, process 1100 may include the onboarding application automatically connecting the desired IoT device to the network upon activation of the desired IoT device and based on received network configuration data (block 1130). For example, the onboarding application may automatically connect the desired IoT device to a network upon activation of the desired IoT device and based upon the received network configuration data, as described above. As further shown in FIG. 11, process 1100 may include adding the network configuration data of the desired IoT device to the database (block 1140). For example, the onboarding application may add the network configuration data of the desired IoT device to the database, as described above.

Process 1100 may include additional implementations, such as any single implementation or any combination of implementations described below and/or in connection with one or more other processes described elsewhere herein. In a first implementation, process 1100 may include the onboarding application determining that a jurisdiction exists for the particular network, and then discovering at least one device that manages the jurisdiction. Further, the process 1100 may include the onboarding application listing the set of devices within the jurisdiction, and then automatically adding the particular device to the jurisdiction.

In a second implementation, alone or in combination with the first implementation, process 1100 may include onboarding application determining a jurisdiction does not exist for the particular network, and then requesting to create a new jurisdiction. Further, the onboarding application may establish the new jurisdiction, and then automatically add the desired IoT device to the new jurisdiction. In a third implementation, alone or in combination with one or more of the first and second implementations, process 1100 may include the onboarding application providing, by the onboarding application utilizing augmented reality techniques, a digital image of the network that includes a listing of the set of devices. The digital image may be modified by an authenticated device (e.g., a customer device) to include device instructions to a digital image of the device installation. In some embodiments, the augmented reality techniques can be used to add instructions, drawings, enhancements, etc. to a live digital image of device installation.

In a fourth implementation, alone or in combination with one or more of the first through third implementations, the network configuration data for the desired IoT device, received by the onboarding application running on the network, may be transmitted wirelessly from a remote location by the onboarding application running on a client device. In a fifth implementation, alone or in combination with one or more of the first through fourth implementations, the database, that includes configuration data for each of the devices connected to the network, may be configured to be transferrable instantaneously. In some embodiments, the application running on an authorized device may move a subset of a jurisdiction and any corresponding devices to a new location. For example, the physical boundaries listed in the authorization model for the jurisdiction may be updated and replaced with a new physical boundary. This may change the physical boundary, while leaving the devices within the jurisdiction unchanged. In some embodiments, the configuration data for each of the devices may be updated with a new set of network credentials (e.g., a new router is being used).

In a sixth implementation, alone or in combination with one or more of the first through fifth implementations, process 1100 may include the onboarding application transferring configuration data for one device of the set of devices connected to the network to a separate network, after determining that the one device is compatible with the separate network. In a seventh implementation, alone or in combination with one or more of the first through sixth implementations, process 1100 may include the onboarding application detecting the functionality of, or performing diagnostics for, each of the devices connected to the network for mitigating effects, and then prompting a notification upon detecting any mitigating effects of any of the devices.

In an eighth implementation, alone or in combination with one or more of the first through seventh implementations, process 1100 may include the onboarding application consulting, by the onboarding application, an owner preference guide for a particular jurisdiction, and then updating, automatically, based on the owner preference guide, at least one device connected to the network.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for a dynamic Internet of Things (IoT) environment, comprising:
    determining, by an onboarding application running on a client device while connected to an IoT environment, an authorization model defining network configuration data and authenticated devices with authorization for a jurisdiction of the IoT environment, the jurisdiction imposing security protocols, control rights, access rights, and managerial rights for the IoT environment based on the authorization model; and
    prior to attempting to connect a desired device to the IoT environment:
    receiving, by the onboarding application running at least in part on the client device at a location remote from the IoT environment, an identifier of a desired device intended for connection to, but not yet connected to, the IoT environment;
    determining, by the onboarding application, device configuration data for the desired device based on the identifier;
    determining, by the onboarding application, configuration criteria based on the authorization model;
    comparing the device configuration data and the configuration criteria to determine whether a compatibility threshold has been satisfied;
    indicating, to a user of the client device and when the compatibility threshold has been satisfied, that the device is compatible with the IoT environment;
    determining at least one alternative device that is compatible with the IoT environment, when the compatibility threshold is not satisfied; and
    displaying a notification on the client device indicating the at least one alternative device and information about the at least one alternative device.

2. The method of claim 1, further comprising discovering at least one other device running on the jurisdiction that has a managerial role for managing the jurisdiction.

3. The method of claim 2, further comprising determining a context of the client device, the context being selected from the group comprising a cellular/LTE/5G network, home Wi-Fi network, a vacation home, a store, and a hotel room, wherein the context defines operation of the onboarding application.

4. The method of claim 1, further comprising:
    determining, based on the network configuration data, that the desired device requires a network bridge to be compatible with the IoT environment; and prompting, via the client device in a notification, that the network bridge is required for the device prior to being added to the IoT environment.

5. The method of claim 1, further comprising:
determining, based on the received network configuration data, that the desired device requires additional equipment to operate in the IoT environment;
displaying, on the client device, a notification indicating that the additional equipment is required for the desired device to operate in the IoT environment; and
displaying, on the client device, the additional equipment.

6. The method of claim 1, wherein the comparison between the network configuration data and the configuration criteria further comprises consulting a database of the IoT environment that includes configuration data for a set of devices located within the IoT environment.

7. The method of claim 1, further comprising:
preconfiguring, remotely, by the onboarding application, based on the received configuration data of the device, the IoT environment to allow the device to connect to the IoT environment; and
automatically connecting the device with the IoT environment when the device is discernable by the IoT environment.

8. An Internet-of-Things (IoT) system, comprising:
a processor; and
a memory storing machine-readable instructions that when executed by the processor cause the processor to:
determine, while connected to an IoT environment, an authorization model defining network configuration data and authenticated devices with authorization for a jurisdiction of the IoT environment, the jurisdiction imposing security protocols, control rights, access rights, and managerial rights for the IoT environment based on the authorization model; and
prior to attempting to connect a desired device to the IoT environment and at a location remote from and not connected to the IoT environment:
receive an identifier of the desired device not yet purchased;
determine device configuration data for the desired device based on the identifier;
determine configuration criteria based on the authorization model;
compare the device configuration data and the configuration criteria to determine whether a compatibility threshold has been satisfied;
indicate, to a user when the compatibility threshold has been satisfied, that the device is compatible with the IoT environment;
determine at least one alternative device that is compatible with the IoT environment when the compatibility threshold is not satisfied; and
display a notification indicating the at least one alternative device and information about the at least one alternative device.

9. The IoT system of claim 8, the memory storing further machine-readable instructions that when executed by the processor cause the processor to discover at least one other device running on the jurisdiction that has a managerial role for managing the jurisdiction.

10. The IoT system of claim 9, the memory storing further machine-readable instructions that when executed by the processor cause the processor to determine a context of the system, the context being selected from the group comprising a cellular/LTE/5G network, home Wi-Fi network, a vacation home, a store, and a hotel room, wherein the context defines operation of the machine-readable instructions.

11. The IoT system of claim 8, the memory storing further machine-readable instructions that when executed by the processor cause the processor to:
determine, based on the network configuration data, that the desired device requires a network bridge to be compatible with the IoT environment; and
display a notification indicating that the network bridge is required for the device prior to being added to the IoT environment.

12. The IoT system of claim 8, the memory storing further machine-readable instructions that when executed by the processor cause the processor to:
determine, based on the received network configuration data, that the desired device requires additional equipment to operate in the IoT environment;
display a notification indicating that the additional equipment is required for the desired device to operate in the IoT environment; and
display details of the additional equipment.

13. The IoT system of claim 8, the memory storing further machine-readable instructions that when executed by the processor cause the processor to consult a database of the IoT environment that includes configuration data for a set of devices located within the IoT environment.

14. The IoT system of claim 8, the memory storing further machine-readable instructions that when executed by the processor cause the processor to:
preconfigure, remotely based on the received configuration data of the device, the IoT environment to allow the device to connect to the IoT environment; and
automatically connect the device with the IoT environment when the device is discernable by the IoT environment.

* * * * *